(12) United States Patent
Kohara et al.

(10) Patent No.: US 9,882,434 B2
(45) Date of Patent: Jan. 30, 2018

(54) NON-CONTACT POWER TRANSMISSION DEVICE DRIVE METHOD AND NON-CONTACT POWER TRANSMISSION DEVICE

(71) Applicant: Panasonic Corporation, Osaka (JP)

(72) Inventors: Hiroshi Kohara, Osaka (JP); Satoshi Hyodo, Hyogo (JP); Kenichi Irie, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 779 days.

(21) Appl. No.: 14/382,889

(22) PCT Filed: Feb. 28, 2013

(86) PCT No.: PCT/JP2013/001229
§ 371 (c)(1),
(2) Date: Sep. 4, 2014

(87) PCT Pub. No.: WO2013/132799
PCT Pub. Date: Sep. 12, 2013

(65) Prior Publication Data
US 2015/0042171 A1 Feb. 12, 2015

(30) Foreign Application Priority Data
Mar. 9, 2012 (JP) ................. 2012-053325

(51) Int. Cl.
*H01F 27/42* (2006.01)
*H01F 37/00* (2006.01)
(Continued)

(52) U.S. Cl.
CPC ............. *H02J 50/12* (2016.02); *H02J 5/005* (2013.01); *H02J 7/025* (2013.01); *H02J 50/60* (2016.02); *H02J 50/40* (2016.02)

(58) Field of Classification Search
CPC ...... H02J 7/025; H02J 7/00; H02J 7/02; H02J 5/005; H01F 38/14; H01F 38/12; H02M 3/2276
(Continued)

(56) References Cited

U.S. PATENT DOCUMENTS 8,054,036 B2 * 11/2011 Onishi ................. H02J 7/025
320/108
8,111,041 B2 * 2/2012 Onishi ................. H02J 5/005
320/108
(Continued)

FOREIGN PATENT DOCUMENTS

EP 1022840 A2 1/2000
EP 2224572 A2 9/2008
(Continued)

OTHER PUBLICATIONS

International Search Report for corresponding International Application No. PCT/JP2013/001229 dated Apr. 23, 2013.
(Continued)

*Primary Examiner* — Rexford Barnie
*Assistant Examiner* — Jagdeep Dhillon
(74) *Attorney, Agent, or Firm* — Renner, Otto, Boisselle & Sklar, LLP

(57) ABSTRACT

A primary coil (L1) is excited by selectively using: a first resonance frequency (AL) near a frequency determined by the primary coil (L1) and a primary-side capacitor (C), said primary coil (L1) being placed in a power-supply area (AR); and a second resonance frequency (BL) near a frequency determined by a secondary-side inductance component and a secondary-side capacitance component, said components existing when the primary coil (L1) faces a secondary coil (L2).

19 Claims, 5 Drawing Sheets

(51) Int. Cl.
*H01F 38/00* (2006.01)
*H02J 50/12* (2016.01)
*H02J 5/00* (2016.01)
*H02J 7/02* (2016.01)
*H02J 50/60* (2016.01)
*H02J 50/40* (2016.01)

(58) Field of Classification Search
USPC .......... 307/104, 149, 66, 82, 64, 45; 363/25,
363/23; 320/108, 109, 110, 106;
324/629, 628, 622; 700/291; 178/43
See application file for complete search history.

(56) References Cited

U.S. PATENT DOCUMENTS

| | | | |
|---|---|---|---|
| 8,222,860 B2* | 7/2012 | Kamijo | H02J 7/025 320/108 |
| 8,575,944 B2* | 11/2013 | Dorairaj | H02J 7/025 307/104 |
| 2006/0239043 A1* | 10/2006 | Ohbo | H02M 3/3376 363/25 |
| 2007/0228833 A1* | 10/2007 | Stevens | H02J 5/005 307/45 |
| 2009/0133942 A1* | 5/2009 | Iisaka | H02J 7/025 178/43 |
| 2009/0230777 A1* | 9/2009 | Baarman | H01F 38/14 307/104 |
| 2010/0219697 A1* | 9/2010 | Azancot | H01F 38/14 307/104 |
| 2010/0219698 A1 | 9/2010 | Azancot et al. | |
| 2010/0315039 A1* | 12/2010 | Terao | H01F 38/14 320/108 |
| 2011/0128015 A1* | 6/2011 | Dorairaj | H02J 7/025 324/629 |
| 2011/0196544 A1* | 8/2011 | Baarman | H02J 5/005 700/291 |
| 2012/0001493 A1* | 1/2012 | Kudo | H02J 5/005 307/104 |
| 2012/0091993 A1* | 4/2012 | Uramoto | H02J 7/025 324/105 |
| 2012/0175967 A1* | 7/2012 | Dibben | H02J 5/005 307/104 |
| 2012/0235636 A1* | 9/2012 | Partovi | H02J 7/025 320/108 |
| 2013/0241478 A1 | 9/2013 | Azancot et al. | |
| 2014/0285008 A1 | 9/2014 | Azancot et al. | |

FOREIGN PATENT DOCUMENTS

| | | | |
|---|---|---|---|
| EP | 2317625 A2 * | 5/2011 | ............. H02J 7/025 |
| EP | 2317625 A2 | 11/2011 | |
| JP | 2006-230129 | 8/2006 | |
| JP | 2008-236917 | 10/2008 | |
| JP | 2012-016171 | 1/2012 | |

OTHER PUBLICATIONS

Extended European Search Report for corresponding European application No. 13758168.2 dated Apr. 7, 2014.
English translation of International Preliminary Report on Patentability for corresponding International Application No. PCT/JP2013/001229 dated Sep. 9, 2014.

* cited by examiner

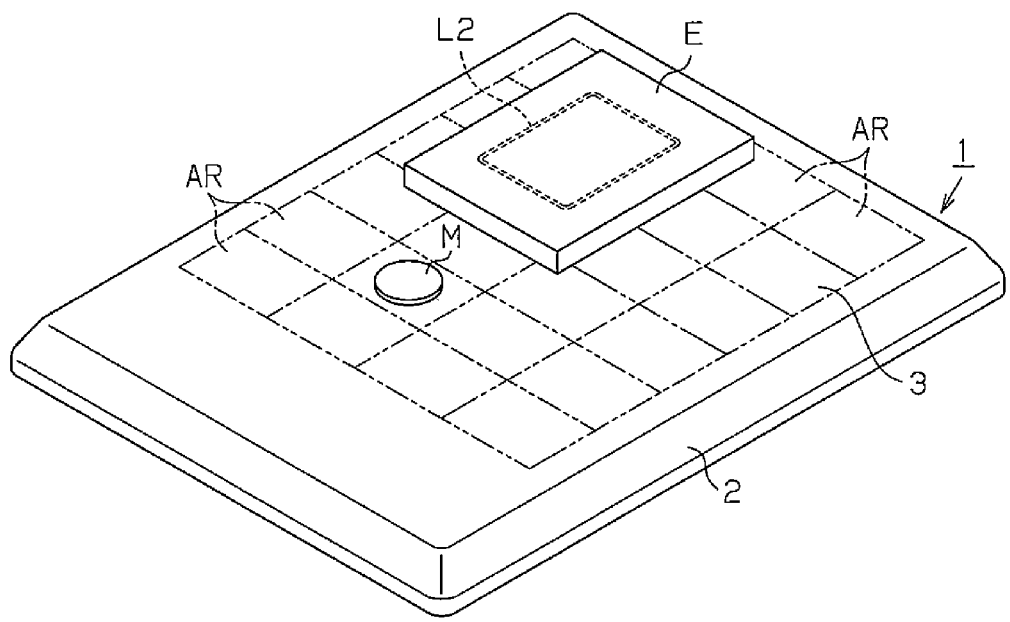
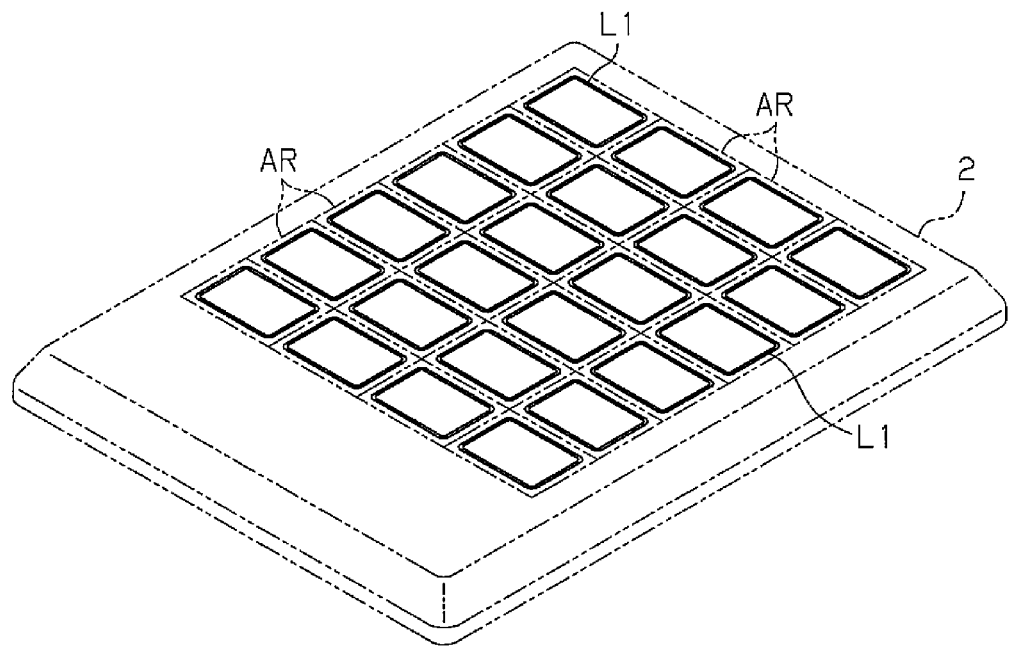

US 9,882,434 B2

NON-CONTACT POWER TRANSMISSION DEVICE DRIVE METHOD AND NON-CONTACT POWER TRANSMISSION DEVICE

TECHNICAL FIELD

The present invention relates to a method for driving a contactless power transmission device and to a contactless power transmission device.

BACKGROUND ART

In the prior art, an electromagnetic induction type contactless power transmission device includes a metal detector to detect metal set on a setting surface on which an electric instrument is set to be supplied with power. The metal detector prevents the metal from being induction-heated when the electric instrument is supplied with power. Patent document 1 describes an example of a contactless power transmission device including a primary coil for supplying power and a detection coil for detecting metal. The contactless power transmission device excites the primary coil, which is for supplying power, to supply an electric instrument with power and excites the detection coil, which is for detecting metal, to detect metal or the electric instrument.

PRIOR ART DOCUMENT

Patent Document

Patent Document 1: Japanese Laid-Open Patent Publication No. 2006-230129

SUMMARY OF THE INVENTION

Problems that are to be Solved by the Invention

A contactless power transmission device needs the primary coil, which is for supplying power, and the detection coil, which is for detecting metal. This results in the contactless power transmission device having a complicated and enlarged structure. In addition, there is a need to increase the positioning accuracy of the two coils to increase the metal detection accuracy. Thus, high skill is required to assemble the contactless power transmission device.

In particular, the setting surface includes a plurality of separate power supplying areas. Each of the power supplying areas includes a primary coil, which is for supplying power, and a detection coil, which is for detecting metal. This results in a further complicated and further enlarged structure. In such a contactless power transmission device, each power supplying area is easily affected by the magnetic flux from adjacent power supplying areas. Thus, it is desirable that metal and instruments be accurately detected without decreasing the power supplying efficiency.

Further, patent document 1 recites in paragraph 0094 that the detection coil for detecting metal may be omitted when the primary coil, which is for supplying power, is configured to detect the degree of electromagnetic coupling. However, in patent document 1, a primary side circuit, which is formed by the primary coil and a capacitor, only has a single resonance peak value that is set by the primary coil and the capacitor. Accordingly, the supplying of power and the detection of metal and an electric instrument are performed in the proximity of the resonance frequency.

As a result, in the contactless power device, each power supplying area is easily affected by the magnetic flux from adjacent power supplying areas. This results in a shortcoming in that power supplying cannot be performed with high efficiency and an electric instrument cannot be detected with high accuracy.

It is an object of the present invention to provide a contactless power transmission device and a method for driving a contactless power transmission device that allows for reduction in the size of the device, while increasing the power supplying efficiency and detection accuracy of metal and electric instruments with a simple structure.

Means for Solving the Problem

To achieve the above object, the present invention provides a method for driving a contactless power transmission device including a setting surface, which includes a power supplying area, and a primary side circuit, which is located in the power supplying area and formed by a primary coil and a capacitor. When an electric instrument is set in the power supplying area, the contactless power transmission device excites the primary coil located in the power supplying area and produces electromagnetic induction at a secondary coil of a power receiving device arranged in the electric instrument to supply power to the electric instrument. The method includes exciting the primary coil selectively using a first resonance frequency, which is in the proximity of a frequency determined by the primary coil and the capacitor located in the primary side circuit, and a second resonance frequency, which is in the proximity of a frequency determined by an inductance component and a capacitance component of the electric instrument when the primary coil is opposed to the secondary coil.

Preferably, in the above configuration, the exciting the primary coil includes exciting the primary coil at the first resonance frequency to detect metal or the electric device and determine whether or not metal exists in the power supplying area based on a primary coil that flows to the primary coil, suspending excitation of the primary coil at the first resonance frequency and the second resonance frequency when determined that the metal exists in the power supplying area or that nothing exists in the power supplying area, exciting the primary coil at the second resonance frequency to detect the electric instrument when determined that an object other than the metal exists in the power supplying area and determine whether or not the object existing in the power supplying area is the electric instrument based on the primary current, and exciting the primary coil at the second resonance frequency and supplying power to the electric instrument when determined that the object is the electric instrument.

Preferably, in the above configuration, the determining whether or not the object existing in the power supplying area includes performing a determination based on information from the electric instrument based on secondary power received by the electric instrument.

Preferably, in the above configuration, the exciting the primary coil includes suspending excitation of the primary coil at the second resonance frequency when determined that the object existing in the power supplying area is not the electric instrument.

Preferably, in the above configuration, the power supplying area is one of a plurality of power supplying areas defined in the setting surface, the primary coil is one of a plurality of primary coils respectively located in the plurality of power supplying areas, and the exciting the primary coil includes exciting each of the plurality of primary coils selectively using the first resonance frequency and the second resonance frequency.

Preferably, in the above configuration, the exciting the primary coil includes exciting the plurality of primary coils in rounds, and when a primary coil is excited at the second resonance frequency in a previous round, exciting the primary coil at the second resonance frequency and not at the first resonance frequency and shifting to the next primary coil.

Preferably, in the above configuration, the exciting the primary coil includes when determined in the previous round that an object that is metal exists in a power supplying area of a primary coil, shifting, without exciting the primary coil at the first resonance frequency and the second resonance frequency, to the next primary coil.

Preferably, in the above configuration, the exciting the primary coil includes when determined in the previous round that nothing exists in a power supplying area of a primary coil, exciting the primary coil at the first resonance frequency to detect metal or the electric instrument and determining whether metal or an object other than metal exists in the power supplying area based on a primary current flowing to the primary coil.

Preferably, in the above configuration, the exciting the primary coil includes when determined that an object existing in a power supplying area of a primary coil is not the electric device, suspending excitation of the primary coil at the second resonance frequency and shifting to the next primary coil, and when exciting a primary coil of a power supplying area where an existing object is determined to be the electric instrument, exciting the primary coil at the second resonance frequency and shifting to the next primary coil.

Preferably, in the above configuration, the exciting the primary coil includes when determined that an object, which exists in a power supplying area corresponding to a primary coil adjacent to a primary coil of a power supplying area where an existing object is determined as not being the electric instrument in the previous round, is not the electric instrument, simultaneously exciting the two primary coils of both power supplying areas at the second resonance frequency and determining whether or not the object existing in both power supplying areas is the electric instrument.

To achieve the above object, the present invention provides a contactless power transmission device including a setting surface, which includes a power supplying area, and a primary side circuit, which is located in the power supplying area and formed by a primary coil and a capacitor. When an electric instrument is set in the power supplying area, the primary coil located in the power supplying area is excited to produce electromagnetic induction at a secondary coil of a power receiving device arranged in the electric instrument to supply power to the electric instrument. The contactless power transmission device includes a signal generation circuit that selectively generates a first drive signal and a second drive signal. The first drive signal excites the primary coil at a first resonance frequency, which is in the proximity of a frequency determined by the primary coil and the capacitor located in the primary side circuit, and the second drive signal excites the primary coil at a second resonance frequency, which is in the proximity of a frequency determined by an inductance component and a capacitance component of the electric instrument when the primary coil is opposed to the secondary coil. An excitation circuit excites the primary coil in accordance with one of the first drive signal and the second drive signal provided from the signal generation circuit. A control circuit generates an excitation control signal for switching the first drive signal and the second drive signal generated by the signal generation circuit.

Preferably, the above configuration includes an existence detection circuit that determines, when exciting the primary coil at the first resonance frequency, whether or not metal or an object other than metal exists in the power supplying area based on a primary current that flows to the primary coil. An electric instrument determination circuit that determines, when exciting the primary coil at the second resonance frequency, whether or not the electric instrument is set in the power supplying area based on the primary current that flows to the primary coil.

Preferably, in the above configuration, the control circuit provides the signal generation circuit with the first drive signal, excites the primary coil at the first resonance frequency with the excitation circuit, and acquires information from the existence detection circuit indicating whether or not the metal or the object other than metal exists in the power supplying area. Further, the control circuit provides the second drive signal from the signal generation circuit, excites the primary coil at the second resonance frequency with the excitation circuit, and acquires information from the electric instrument determination circuit indicating whether or not the object other than metal set in the power supplying area is the electric instrument that can be supplied with power.

Preferably, in the above configuration, the information indicating whether the metal or the object other than metal exists in the power supplying area includes information indicating that nothing exists in the power supplying area.

Preferably, in the above configuration, the power supplying area is one of a plurality of power supplying areas defined in the setting surface. The primary coil is one of a plurality of primary coils respectively located in the plurality of power supplying areas. The signal generation circuit is one of a plurality of signal generation circuits respectively located in the plurality of power supplying areas. The excitation circuit is one of a plurality of excitation circuits respectively located in the plurality of power supplying areas. The electric instrument determination circuit is one of a plurality of electric instrument determination circuits respectively located in the plurality of power supplying areas. The existence detection circuit is one of a plurality of existence detection circuits respectively located in the plurality of power supplying areas. The contactless power transmission device comprises a plurality of basic power supplying unit circuits respectively located in the plurality of power supplying areas. Each of the plurality of basic power supplying unit circuits is formed by the signal generation circuit, the excitation circuit, the electric instrument determination circuit, and the existence detection circuit. The plurality of basic power supplying unit circuits are all controlled by the control circuit.

Preferably, in the above configuration, the control circuit excites the plurality of primary coils in rounds. When a primary coil is excited at the second resonance frequency in a previous round, the control circuit excites the primary coil at the second resonance and not at the first resonance frequency and shifts to the next primary coil.

Preferably, in the above configuration, when determining in the previous round that an object that is metal exists in a power supplying area of a primary coil, the control circuit shifts, without exciting the primary coil at the first resonance frequency and the second resonance frequency, to the primary coil of the next power supplying area.

Preferably, in the above configuration, when determining in the previous round that an object does not exist in a power supplying area of a primary coil, the control circuit excites the primary coil at the first resonance frequency to detect metal or the electric instrument and determine whether metal or an object other than metal exists in the power supplying area based on a primary current flowing to the primary coil.

Preferably, in the above configuration, when determining that an object existing in a power supplying area of a primary coil is not the electric device, the control circuit suspends excitation of the primary coil at the second resonance frequency and shifts to the next primary coil. When determining that an object existing in the power supplying area is the electric instrument, the control circuit excites the primary coil at the second resonance frequency and shifts to the next primary coil.

Preferably, in the above configuration, when determining that an object, which exists in a power supplying area corresponding to a primary coil adjacent to a primary coil of a power supplying area where an existing object is determined as not being the electric instrument in the previous round, is not the electric instrument, the control circuit simultaneously excites the two primary coils of both power supplying areas at the second resonance frequency and determines whether or not the object existing in both power supplying areas is the electric instrument.

Preferably, in the above configuration, the control circuit provides the signal generation circuit with an excitation control signal through the excitation circuit to excite the primary coil at a plurality of corrected resonance frequencies. The control circuit acquires the first resonance frequency from information from the existence detection circuit based on excitation of the primary coil at the plurality of corrected resonance frequencies and provides the signal generation circuit with the excitation control signal to excite the primary coil at the acquired first resonance frequency with the excitation circuit.

Effect of the Invention

The present invention allows for reduction in the size of the device, while increasing the power supplying efficiency and detection accuracy of metal and electric instruments with a simple structure.

BRIEF DESCRIPTION OF THE DRAWINGS

FIG. 1 is a perspective view entirely showing a contactless power transmission device and an electric instrument.

FIG. 2 is a schematic diagram showing power supplying areas and the layout of primary coils in the power supplying areas.

EMBODIMENTS OF THE INVENTION

Figure 3:
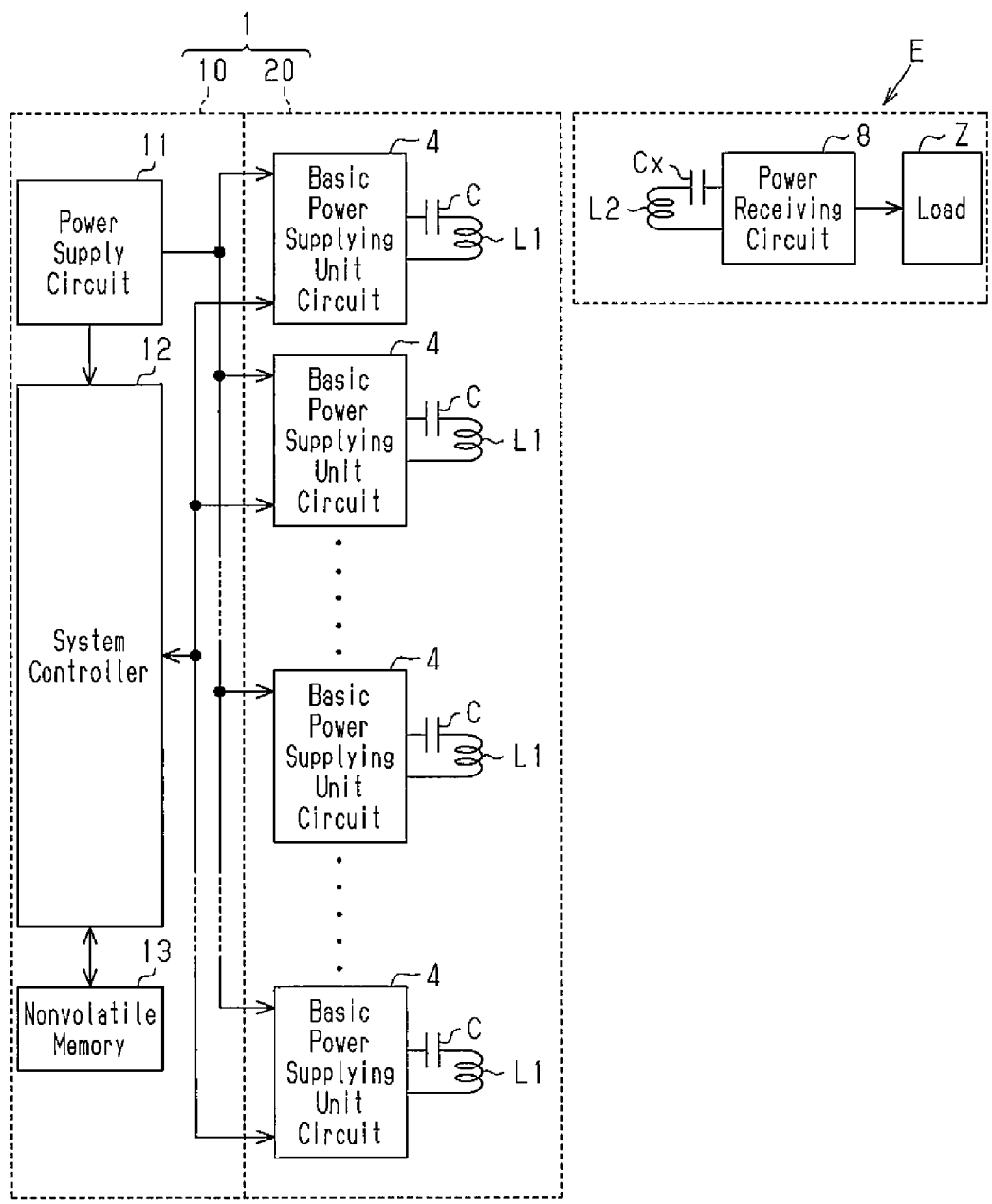
FIG. 3 is an electric block circuit diagram of the contactless power transmission device and an electric instrument.

A contactless power transmission device according to one embodiment of the present invention will now be described with reference to the drawings.

FIG. 1 is a perspective view entirely showing a contactless power transmission device (hereafter referred to as the power supplying device) 1 and an electric instrument (hereafter referred to as the instrument) E, which is supplied with power in a contactless manner from the power supplying device 1.

The power supplying device 1 includes a tetragonal and planar housing 2. The housing 2 includes an upper surface defining a flat setting surface 3 on which the instrument E is set. A plurality of tetragonal power supplying areas AR are defined in the setting surface 3. In the present embodiment, the setting surface 3 includes twenty-four power supplying areas AR, four power supplying areas AR laid out in the sideward direction (lateral direction) and six power supplying areas AR laid out in the vertical direction (longitudinal direction).

Referring to FIG. 2, in the housing 2, a primary side circuit is arranged at a location corresponding to each power supplying area AR. The primary side circuit includes a series circuit formed by a resonance capacitor C (refer to FIG. 3) and a primary coil L1, which is wound into a tetragonal shape in conformance with the outer shape of the corresponding power supplying area AR. The power supplying areas AR each includes one of a plurality of basic power supplying unit circuits 4 (refer to FIG. 3) arranged in the housing 2. The primary coil L1 of each power supplying area AR is connected to the basic power supplying unit circuit 4 of the power supplying area AR. The primary coil L1 of each power supplying area AR is excited by the corresponding basic power supplying unit circuit 4.

Each primary coil L1 is configured to be excited and detect whether or not an object exists in the corresponding power supplying area AR. In this case, the operational frequency fn of the basic power supplying unit circuit 4 is set in advance.

A process for setting the operational frequency fn will now be described with reference to FIG. 7.

Figure 7:
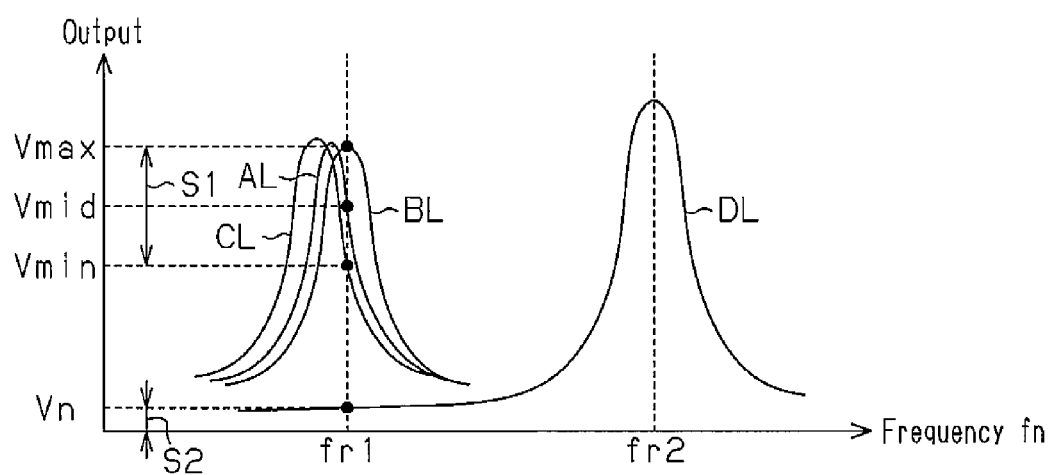
FIG. 7 is a characteristic diagram showing the output relative to the frequency to illustrate a first resonance frequency and a second resonance frequency.

In FIG. 7, the first resonance characteristic AL shows the output of the primary coil L1 relative to frequency in the primary side circuit when nothing is set on the power supplying area AR.

In FIG. 7, when a metal M is set on the power supplying area AR, the second resonance characteristic BL shows the output of the primary coil L1 relative to frequency between the primary coil L1 and the metal M.

Further, in FIG. 7, when the instrument E is set on the power supplying area AR, the third resonance characteristic CL shows the output of the primary coil L1 relative to frequency in a secondary side circuit of the instrument E, which opposes the primary coil L1. The secondary side circuit includes a series circuit formed by a secondary coil L2 and a resonance capacitor Cx (refer to FIG. 3).

It has been checked through experiments, tests, and the like that the resonance frequencies of the first to third resonance characteristics AL, BL, and CL increase in the order of the third resonance frequency CL, the first resonance frequency AL, and the second resonance frequency BL. In addition, the second and third resonance characteristics BL and CL shift from the first resonance characteristic AL based on inductance changes caused by the metal M or the instrument E. Thus, these frequency bands exist in extreme proximity to one another.

If the primary coil L1 is excited at the frequency fr1 of the first resonance characteristic AL when nothing is set in the power supplying area AR, the inductance of the primary coil L1 does not change. Thus, the resonance characteristic is held at the first resonance characteristic AL. Accordingly, the output relative to the frequency fr1 produced at the primary coil L1 has a middle value Vmid as shown in FIG. 7.

If the primary coil L1 is excited at the frequency fr1 of the first resonance characteristic AL when metal M is set in the power supplying area AR, the set metal M changes the inductance of the primary coil L1. Thus, the resonance characteristic is changed from the first resonance characteristic AL to the second resonance characteristic BL. Accordingly, the output relative to the frequency fr1 produced at the primary coil L1 has the maximum value Vmax as shown in FIG. 7.

If the primary coil L1 is excited at the frequency fr1 of the first resonance characteristic AL when the instrument E is set in the power supplying area AR, the set instrument E changes the inductance of the primary coil L1. Thus, the resonance characteristic is changed from the first resonance characteristic AL to the third resonance characteristic CL. Accordingly, the output relative to the frequency fr1 produced at the primary coil L1 has the minimum value Vmin as shown in FIG. 7.

In this manner, the frequency fr1 of the first resonance characteristic AL is the first resonance frequency (Fr1), and the primary coil L1 is excited at the first resonance frequency. This allows for detection of whether or not an object exists on the power supplying area AR based on the output value relative to the first resonance frequency fr1 produced at the primary coil L1. Further, when an object exists on the power supplying area AR, it may be detected whether the object is a metal M or the instrument E.

In the present embodiment, when a metal M is set on the primary coil L1, the first resonance frequency fr1 is set to increase the change in the output relative to the frequency of the first resonance characteristic AL regardless of position, size, or the like of the metal M.

Further, each primary coil L1 is configured to be excited solely or in cooperation with another primary coil L1 to produce electromagnetic induction at the secondary coil L2 in the instrument E that is set on a plurality of the power supplying areas AR.

The operational frequency fn at which the basic power supplying unit circuit 4 excites the primary coil L1 to supply the instrument E with power is set as described below. When the instrument E is set in the power supplying area AR, the primary coil L1 and the secondary coil L2 forms a configuration like a transformer. In this configuration, the operational frequency fn is set at a resonance frequency (hereafter referred to as the second resonance frequency) fr2 that is determined by the inductance component and capacitance component of the device E.

Accordingly, in the present embodiment, by exciting the primary coil L1 at the second resonance frequency fr2, the instrument E is able to receive power the power supplied from the primary coil L1 with a low loss.

Here, the interval of the second resonance frequency fr2 and the first resonance frequency fr1 is set as described below.

As shown in FIG. 7, a fourth resonance characteristic DL is the resonance characteristic that becomes the maximum output at the second resonance frequency fr2. The fourth resonance characteristic DL indicates the output of the primary coil L1 relative to the frequency in the secondary side circuit of the instrument E opposing the primary coil L1 when the instrument E is set in the power supplying area AR.

As shown in FIG. 7, at the fourth resonance characteristic DL, the output produced at the primary coil L1 relative to the first resonance frequency fr1 is smaller than the minimum value Vmin and close to zero volts. Further, at the fourth resonance characteristic, the voltage value Vn decreases as the interval between the second resonance frequency fr2 and the first resonance frequency fr1 increases.

The width from the maximum value Vmax to the minimum value Vmin is indicated by S1 (Vmax−Vmin). The width from the voltage value Vn to zero volts in the first resonance frequency fr1 of the fourth resonance characteristic DL is indicated by S2 (Vn−0). Here, S1>S2 is satisfied.

Accordingly, when a metal M or the instrument E is detected by exciting the primary coil L1 at the second resonance frequency fr2 of the fourth resonance characteristic DL in the power supplying area AR and by exciting the primary coil L1 at the first resonance frequency fr1 in the adjacent power supplying area AR, S1>S2 is satisfied. Thus, the power supplying area AR exciting the primary coil L1 at the second resonance frequency fr2 has a small influence on the adjacent power supplying area AR.

More specifically, as shown in FIG. 7, the resonance frequency needs to be set to have the fourth resonance characteristic DL so that the interval between the second resonance frequency fr2 and the first resonance frequency fr1 satisfies S1>S2.

In the present embodiment, the first resonance frequency fr1 is set in the proximity of 70 kHz, and the second resonance frequency fr2 is set in the proximity of 140 kHz. The first resonance frequency Fr1 is set before shipment from the factory, whenever a fixed usage period elapses, or whenever an adjustment switch (not shown) of the power supplying device 1 is operated.

As described above, in the present embodiment, since the resonance frequency changes due to differences between each primary coil L1 and each resonance capacitor C and due to the degree of temporal changes, the first resonance frequency fr1 of each power supplying area AR is based on the resonance frequency that is determined by the primary coil L1 and the resonance capacitor C in the primary side circuit of the power supplying area AR. This maintains the resonant state to constantly obtain a stable output and accurately detect metal M and the instrument E.

The electrical configuration of the power supplying device 1 and the instrument E will now be described with reference to FIG. 3.

Instrument E

The instrument E will first be described. As shown in FIG. 3, the instrument E includes a secondary side circuit formed by a series circuit of the secondary coil L2 and the resonance capacitor Cx. The instrument E further includes a power receiving circuit 8, which functions as a power receiving device that receives secondary power from the power supplying device 1, and the load Z. The secondary coil L2 is excited by electromagnetic induction resulting from the excitation of a primary coil L1 in the power supplying device 1. This supplies the instrument E with secondary power.

Figure 6:
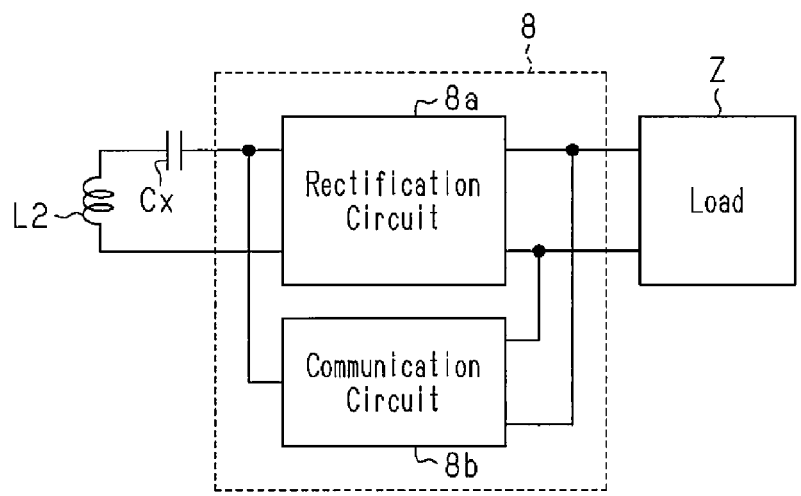
FIG. 6 is an electric block circuit diagram of a power receiving device of the electric instrument.

As shown in FIG. 6, the power receiving circuit 8 includes a rectification circuit 8a and a communication circuit 8b.

The rectification circuit 8a is connected to the secondary side circuit formed by a series circuit of the secondary coil L2 and the resonance capacitor Cx. The rectification circuit 8a converts the secondary power to ripple-free DC voltage. Here, the primary coil L1 is excited at the second resonance frequency fr2 that is set by the configuration of the instrument E. Thus, the power is supplied with high efficiency. The rectification circuit 8a supplies a load Z of the instrument E with the converted DC voltage.

When the primary coil L1 is excited at the first resonance frequency fr1 and not the second resonance frequency Fr2, the secondary coil L2 is not excited by the power supplied from the primary side.

The load Z need only be a device that is driven by the secondary power generated at the secondary coil L2. For example, the load Z may be a device driven on the setting surface 3 using DC power converted by the rectification circuit 8a. Alternatively, the load Z may be a device driven on the setting surface 3 directly using the secondary power as AC power. Further, the load Z may be a device that charges an incorporated rechargeable battery (secondary battery) using DC power that is converted by the rectification circuit 8a.

The communication circuit 8b uses the DC voltage from the rectification circuit as a drive source. The communication circuit 8b generates an instrument authentication signal ID and an excitation request signal RQ that are transmitted via the secondary coil L2 to the power supplying device 1. The device authentication signal ID is an authentication signal indicating that the instrument E is allowed to be supplied with power from the power supplying device 1. The excitation request signal RQ is a request signal that requests the power supplying device 1 to supply power.

For example, the communication circuit 8b does not generate the device authentication signal ID and the excitation request signal RQ when a power switch of the instrument E used to drive the load Z is turned off. Further, when the instrument E includes a microcomputer, and the microcomputer determines to suspend the supply of power, the communication circuit 8b does not generate the device authentication signal ID and the excitation request signal RQ.

When the primary coil L1 is excited at the first resonance frequency fr1, and the primary coil L1 and the secondary coil L2 do not resonate, the secondary coil L2 is not excited. This decreases the DC voltage from the rectification circuit and does not drive the communication circuit 8b. Accordingly, the communication circuit 8b does not generate the instrument authentication signal ID and the excitation request signal RQ.

The instrument authentication signal ID and the excitation request signal RQ include a plurality of bits and are binaries (high level, low level). The instrument authentication signal ID and the excitation request signal RQ are provided to a power receiving line that connects the resonance capacitor Cx and the rectification circuit 8a. The amplitude of a secondary coil flowing to the secondary coil L2 is changed based on the instrument authentication signal ID and the excitation request signal RQ provided to the power receiving line.

Changes in the amplitude of the secondary current of the second resonance frequency fr2 change the magnetic flux radiated from the secondary coil L2. The changed magnetic flux changes the amplitude of the primary current flowing through the primary coil L1 when transmitted as electromagnetic induction to the primary coil L1.

More specifically, the binary signals (instrument authentication signal ID and excitation request signal RQ) modulate the amplitude of the secondary current of the second resonance frequency fr2 flowing between the two terminals of the secondary coil L2. The magnetic flux of the amplitude-moderated secondary current of the secondary resonance frequency fr2 is transmitted as a transmission signal to the primary coil L1.

Power Supplying Device 1

The power supplying device 1 will now be described. As shown in FIG. 3, the power supplying device 1 includes a common unit section 10 and a basic unit section 20.

The common unit section 10 includes a power supply circuit 11, which supplies the basic unit section 20 with power, a system controller 12, which entirely controls the basic unit section 20, and the nonvolatile memory 13, which stores various types of data.

The power supply circuit 11 includes a rectification circuit and a DC/DC converter. The power supply circuit is supplied with external commercial power. The power supply circuit 11 rectifies the supplied commercial power with the rectification circuit. The power supply circuit 11 converts the rectified DC voltage to the desired DC voltage Vdd with the DC/DC converter and supplies the DC voltage Vdd as drive power to the system controller 12, the nonvolatile memory 13, and the basic unit section 20.

The system controller 12 is formed by a microcomputer and controls the basic unit section 20. The nonvolatile memory 13 stores various types of data used when the system controller 12 performs various types of determination processing operations. Further, the nonvolatile memory 13 includes twenty-four storage regions each assigned to one of the twenty-four power supplying areas AR. Each storage region stores the present information of the corresponding power supplying area AR.

As shown in FIG. 3, the basic unit section 20 includes a plurality of (twenty-four) basic power supplying unit circuits 4 respectively corresponding to the plurality of (twenty-four) power supplying areas AR (plurality of (twenty-four) primary coils L1). Each basic power supplying unit circuit 4, which transfers data to and from the system controller 12, is controlled by the system controller 12.

The basic power supplying unit circuits 4 have the same circuit configuration. Thus, for the sake of brevity, only one basic power supplying unit circuit 4 will be described with reference to FIG. 4.

Figure 4:
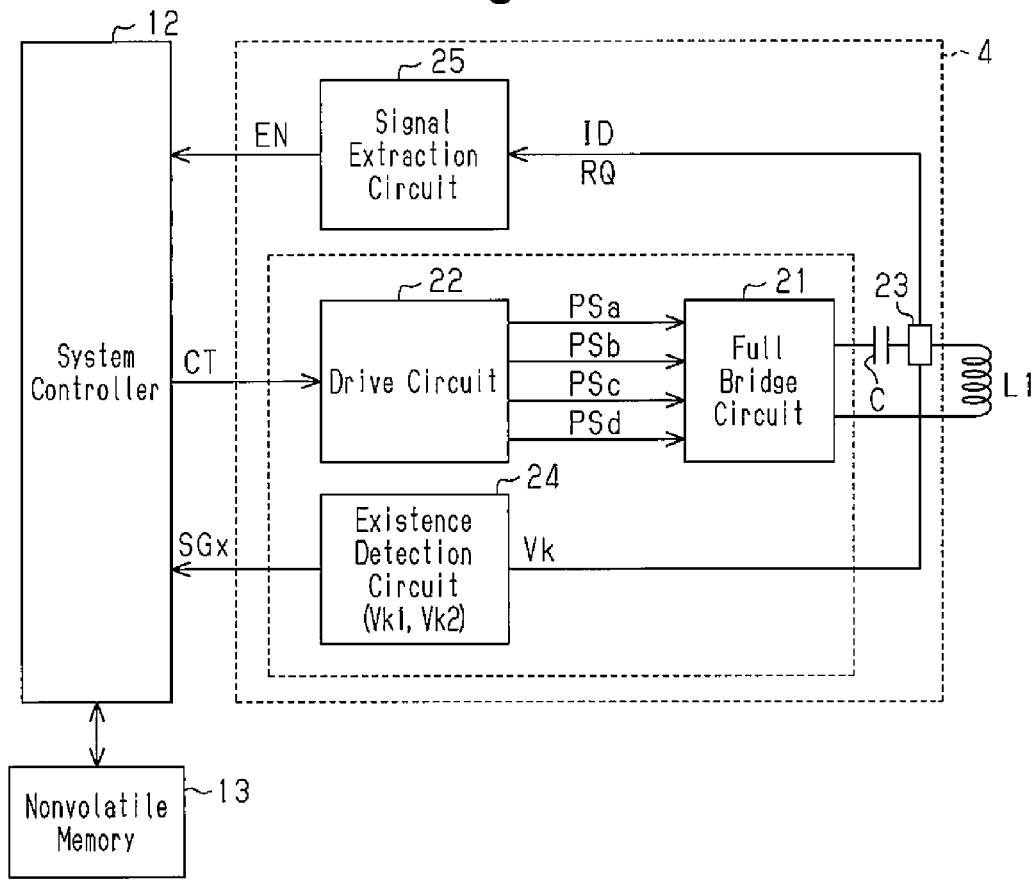
FIG. 4 is an electric block circuit diagram illustrating a basic power supplying unit circuit.

As shown in FIG. 4, the basic power supplying unit circuit 4 includes a full bridge circuit 21 functioning as an excitation circuit, a drive circuit 22 functioning as a signal generation circuit, a primary current detection circuit 23, an existence detection circuit 24, and a signal extraction circuit 25 functioning as an electric instrument determination circuit.

Figure 5:
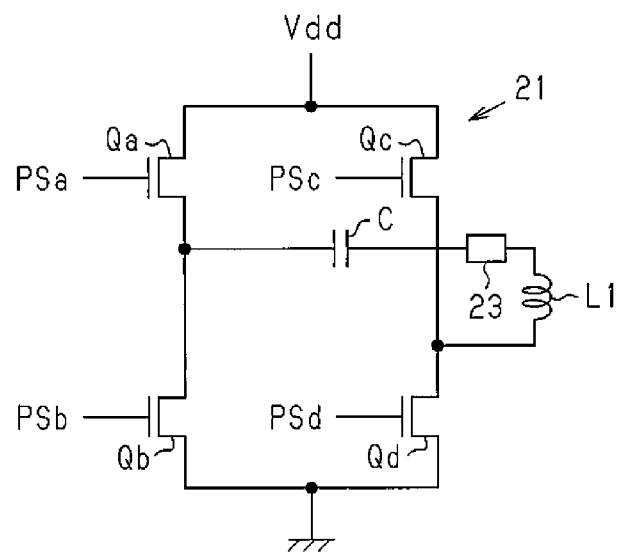
FIG. 5 is an electric circuit diagram illustrating a full bridge circuit.

The full bridge circuit 21 is a known circuit. As shown in FIG. 5, the full bridge circuit 21 includes four MOS transistors Qa, Qb, Qc, and Qd. The four MOS transistors Qa, Qb, Qc, and Qd are divided into the pair of the MOS transistors Qa and Qd and the pair of the MOS transistors Qb and Qc and are bridged and connected by a primary side circuit formed by a series circuit including the primary coil L1 and a resonance capacitor C. The primary coil L1 is excited by alternately switching ON and OFF the two pairs.

An excitation control signal CT is provided from the system controller 12 of the common unit section 10 to the drive circuit 22. The drive circuit 22 generates four drive signals PSa, PSb, PSc, and PSd provided to the gate terminals of the four MOS transistors Qa, Qb, Qc, and Qd, respectively. Thus, in response to the excitation control signal CT from the system controller 12, the drive circuit 22 alternately switches ON and OFF each pair (full bridge operation) to generate the four drive signals PSa, PSb, PSc, and PSd used to excite the primary coil L1.

In detail, the drive circuit 22 provides the two drive signals PSa and PSd, which having the same pulse waveform, respectively to the two gate terminals of the MOS transistors Qa and Qd in the first pair. The drive circuit 22 also provides the two drive signals PSb and PSc, which are complementary signals of the two drive signals PSa and PSd and have the same pulse waveform, respectively to the two gate terminals of the MOS transistors Qb and Qc in the second pair.

Accordingly, the primary coil L1 is excited by alternately turning ON and OFF (full bridge operation) the first pair of the MOS transistors Qa and Qd and the second pair of the MOS transistors Qb and Qc.

When detecting the existence of an object, the drive circuit 22 alternately switches ON and OFF (full bridge operation) each pair based on the excitation control signal CT from the system controller 12 to generate the four drive signals PSa, PSb, PSc, and PSd used to excite the primary coil L1. The drive circuit 22 generates the four drive signals PSa, PSb, PSc, and PSd to excite the primary coil L1 at the first resonance frequency fr1.

In the same manner, when supplying power to the instrument E, the drive circuit 22 alternately switches ON and OFF (full bridge operation) each pair based on the excitation control signal CT from the system controller 12 to generate the four drive signals PSa, PSb, PSc, and PSd used to excite the primary coil L1.

In the present embodiment, when a full bridge operation is performed during existence detection, the duty ratio is decreased to alternately switch ON and OFF the MOS transistors Qa and Qd of the first pair and the MOS transistors Qb and Qc of the second pair to excite the primary coil L1 at the first resonance frequency. That is, the OFF time and the ON time of the MOS transistor Qd and the MOS transistor Qb are set so that the OFF time is equal to the ON time. The OFF time and the ON time of the MOS transistor Qa and the MOS transistor Qc are set so that the ON time is short and the OFF time is long. In this case, a dead time is set for the four MOS transistors Qa, Qb, Qc, and Qd so that the MOS transistors Qd and Qb and the MOS transistors Qa and Qc are not simultaneously turned ON.

As a result, current consumption is reduced. Further, the magnetic field generated in the space where metal M is induction-heated is reduced.

The primary current detection circuit 23 is arranged between one terminal of the primary coil L1 and the full bridge circuit 21. The primary current detection circuit 23 detects the present primary current that is flowing to the primary coil L1.

The existence detection circuit 24 is connected to the primary current detection circuit 23. When the primary coil L1 is being excited by the first resonance frequency fr1, the primary current detection circuit 23 supplies the existence detection circuit 24 with output voltage based on the preset primary current of the primary coil L1 as the existence detection voltage Vk. The existence detection circuit 24 determines the existence of an object on the setting surface 3 based on the existence detection voltage Vk.

When the existence detection voltage Vk is in a range from a predetermined lower reference value Vk1 to an upper reference value Vk2 (Vk1<Vk<Vk2), the existence detection circuit 24 determines that nothing is set in the power supplying area AR.

Further, when the existence detection voltage Vk is greater than or equal to the upper reference value Vk2 (Vk2≤Vk), the existence detection circuit 24 determines that a metal M is set in the power supplying area AR.

When the existence detection voltage Vk is less than or equal to the lower reference value Vk1 (Vk≤Vk1), the existence detection circuit 24 determines that the instrument E is set in the power supplying area AR.

In other words, when metal M is set as an object in the setting surface 3, the resonance characteristic shifts from the first resonance characteristic AL to the second resonance characteristic BL, and the primary current of the first resonance frequency fr1 flowing to the primary coil L1 increases. As a result, the primary current detection circuit 23 supplies the existence detection circuit 24 with the existence detection voltage Vk that is greater than or equal to the upper reference value Vk2.

When the instrument E is set as an object in the setting surface 3, the resonance characteristic shifts from the first resonance characteristic AL to the third resonance characteristic CL, and the primary current of the first resonance frequency fr1 flowing to the primary coil L1 decreases. As a result, the primary current detection circuit 23 supplies the existence detection circuit 24 with the existence detection voltage Vk that is less than or equal to the lower reference value Vk1.

When nothing is set in the setting surface 3, the resonance characteristic remains the same and does not shift, and the primary current of the first resonance frequency fr1 flowing to the primary coil L1 decreases. In this case, the primary current has a current value that is between the primary current when metal M is set on the setting surface 3 and the primary current when the instrument E is set on the setting surface 3. As a result, the primary current detection circuit 23 supplies the existence detection circuit 24 with the existence detection voltage Vk that is between the lower reference value Vk1 and the upper reference value Vk2.

The lower reference value Vk1 and the upper reference value Vk2 are offset values that are set in advance for the first resonance frequency fr1. The lower reference value Vk1 and the upper reference value Vk2 are obtained in advance through experiments, tests, calculations, and the like and stored beforehand in a memory (not shown) incorporated in the existence detection circuit 24.

When the existence detection voltage Vk is in a range from the lower reference value Vk1 to the upper reference value Vk2, the existence detection circuit 24 determines that nothing is set in the power supplying area AR. The existence detection circuit 24 provides the system controller 12 with a detection signal SGx indicating that there is nothing.

When the existence detection voltage Vk is less than or equal to the lower reference value Vk1, the existence detection circuit 24 determines that the instrument E is set in the power supplying area AR. The existence detection circuit 24 provides the system controller 12 with a detection signal SGx indicating the existence of the instrument E.

When the existence detection voltage Vk is greater than or equal to the upper reference value Vk2, the existence detection circuit 24 determines that a metal M is set in the power supplying area AR. The existence detection circuit 24 provides the system controller 12 with a detection signal SGx indicating the existence of the metal M.

The signal extraction circuit 25 is connected to the primary current detection circuit 23. While the primary coil L1 is being excited at the second resonance frequency fr2, the present primary current of the primary coil L1 is supplied from the primary current detection circuit 23 to the signal extraction circuit 25. An amplitude-modulated transmission signal from the secondary coil L2 of the instrument E, which is set in the setting surface 3, is provided to the signal extraction circuit 25 via the primary current detection circuit 23.

The signal extraction circuit 25 extracts the instrument authentication signal ID and the excitation request signal RQ from the provided transmission signal. When extracting both of the instrument authentication signal ID and the excitation request signal RQ from the transmission signal, the signal extraction circuit 25 provides an enable signal EN to the system controller 12. When extracting only one of the instrument authentication signal ID and the excitation request signal RQ or when extracting none of the signals, the signal extraction circuit 25 does not provide the enable signal EN to the system controller 12.

System Controller 12 and Basic Power Supplying Unit Circuits 4

The system controller 12 controls all of the twenty-four basic power supplying unit circuits 4, which are configured as described above. The system controller 12 scans and sequentially controls in fixed intervals the twenty-four basic power supplying unit circuits 4. In the present embodiment, the system controller 12 sequentially controls the basic power supplying unit circuits 4 of the power supplying areas AR in the first column from the left end of the setting surface 3 as viewed in FIG. 1 from the basic power supplying unit circuit 4 of the uppermost power supplying area AR to the basic power supplying unit circuit 4 of the lowermost power supplying area AR.

Upon completion of the control of the basic power supplying unit circuits 4 in the first column from the left end, the system controller 12 sequentially controls the basic power supplying unit circuits 4 of the power supplying areas AR in the second column from the left end of the setting surface 3 from the basic power supplying unit circuit 4 of the uppermost power supplying area AR to the basic power supplying unit circuit 4 of the lowermost power supplying area AR.

Upon completion of the control of the basic power supplying unit circuits 4 in the second column from the left end, the system controller 12 sequentially controls the basic power supplying unit circuits 4 of the power supplying areas AR in the third column from the left end of the setting surface 3 from the basic power supplying unit circuit 4 of the uppermost power supplying area AR to the basic power supplying unit circuit 4 of the lowermost power supplying area AR.

Upon completion of the control of the basic power supplying unit circuits 4 in the third column from the left end, the system controller 12 sequentially controls the basic power supplying unit circuits 4 of the power supplying areas AR in the fourth column from the left end of the setting surface 3 from the basic power supplying unit circuit 4 of the uppermost power supplying area AR to the basic power supplying unit circuit 4 of the lowermost power supplying area AR.

Upon completion of the control of the basic power supplying unit circuits 4 in the fourth column from the left end, the system controller 12 determines completion of the first round of control executed on the twenty-four basic power supplying unit circuits 4 of the twenty-four power supplying areas AR and returns to the control of the basic power supplying unit circuits 4 of the power supplying areas AR in the first column from the left end of the setting surface 3. Then, the system controller 12 repeats the operation described above and sequentially controls the twenty-four basic power supplying unit circuits 4 of the twenty-four power supplying areas AR.

The order in which the system controller 12 controls the twenty-four basic power supplying unit circuits 4 of the twenty-four power supplying areas AR is based on numerical addresses stored in advance in the nonvolatile memory 13. More specifically, the system controller 12 incorporates a counter that is incremented whenever a basic power supplying unit circuit 4 is controlled. When the count value reaches "24," the counter resets the counter value to "1." The system controller 12 reads an address value that conforms to the count value of the counter from the nonvolatile memory 13. The system controller 12 controls the basic power supplying unit circuit 4 corresponding to the read address.

Accordingly, power supplying or object existence detection for the basic power supplying unit circuit 4 of each power supplying area AR is performed during a fixed period (access period) that is controlled by the system controller 12. Subsequently, power supplying or object existence detection for the basic power supplying unit circuit 4 of each power supplying area AR is performed whenever accessed by the system controller 12.

The power supplying device 1 includes an adjustment switch (not shown) that adjusts the first resonance frequency fr1 to detect metal M or the instrument E. When the adjustment switch (not shown) is operated, the system controller 12 shifts to a first resonance frequency adjustment mode. In this case, the system controller 12 may also sequentially control the twenty-four basic power supplying unit circuits 4 of the twenty-four power supplying areas AR to adjust and change the first resonance frequency fr1 for each of the twenty-four power supplying areas AR.

As described above, the resonance frequency of each power supplying area AR changes due to differences between the primary coils L1 between the resonance capacitors C and due to the degree of temporal changes. Thus, the system controller 12 adjusts the first resonance frequency fr1 for each of the twenty-four power supplying areas AR to constantly stabilize the output by maintaining the resonant condition and to accurately detect metal M or the instrument E.

The operation of the system controller 12 and the basic power supplying unit circuit 4 accessed by the system controller 12 will now be described.

Process for Setting First Resonance Frequency Fr1

A first resonance frequency adjustment mode for setting the first resonance frequency fr1 when exciting the primary coil L1 of each power supplying area AR to detect metal M or the instrument E will now be described.

Before operating the adjustment switch to adjust the first resonance frequency fr1, the twenty-four power supplying areas AR in the setting surface 3 are cleared of objects. When the adjustment switch is operated after clearing each of the power supplying areas AR, the system controller 12 shifts to the first resonance frequency adjustment mode in response to an ON signal of the adjustment switch.

First, the system controller 12 sequentially excites the primary coil L1 in each power supplying area AR with a reference corrected resonance frequency determined in advance through experiments or the like. The system controller 12 is sequentially supplied via the existence detection circuit 24 with an existence detection voltage Vk detected by the primary current detection circuit 23 of each power supplying area AR when excited with the reference corrected resonance frequency.

When the first round of excitation control is completed and the existence detection voltage Vk of each power supplying area AR excited at the reference corrected resonance frequency is completed, the system controller 12 sets the excitation frequency at which a second round of excitation control is performed to a first corrected resonance frequency by shifting the reference corrected resonance frequency toward one side (here, high frequency side). The system controller 12 is sequentially supplied via the existence detection circuit 24 with the existence detection voltage Vk detected by the primary current detection circuit 23 of each power supplying area AR.

When the second round of excitation control is completed and the existence detection voltage Vk of each power supplying area AR detected at the first corrected resonance frequency is stored in the nonvolatile memory 13, the system controller 12 compares the existence detection voltage Vk of the first round of excitation control with the existence detection voltage Vk of the second round of excitation control and sets the excitation frequency for the primary coil L1 of each power supplying area AR based on the comparison result.

When the existence detection voltage Vk in the excitation control of the first round is larger than the existence detection voltage Vk in the excitation control of the second round, the system controller 12 determines that the resonance frequency at which resonance occurs when nothing exists in the power supplying area AR is a frequency lower than the reference corrected resonance frequency. In this case, the system controller 12 sets the excitation frequency at which a third round of excitation control is performed to a second corrected resonance frequency by shifting the reference corrected resonance frequency to a low frequency.

On the other hand, when the existence detection voltage Vk in the excitation control of the first round is smaller than the existence detection voltage Vk in the excitation control of the second round, the system controller 12 determines that the resonance frequency at which resonance occurs when nothing exists in the power supplying area AR is a frequency higher than the reference corrected resonance frequency. In this case, the system controller 12 sets the excitation frequency at which a third round of excitation control is performed to a third corrected resonance frequency by shifting the first corrected resonance frequency to a high frequency.

When the third round of excitation control is completed, the system controller 12 stores, in the nonvolatile memory 13, the existence detection voltage Vk of each power supplying area AR when excited at the second corrected resonance frequency or the third corrected resonance frequency. The system controller 12 compares the existence detection voltage Vk of a fourth round of excitation control with the existence detection voltage Vk of the second round of excitation control and the existence detection voltage Vk of the third round of excitation control to set the excitation frequency for the primary coil L1 of each power supplying area AR based on the comparison result.

When the existence detection voltage Vk in the excitation control of the third round at the second corrected resonance frequency is larger than the existence detection voltage Vk in the excitation control of the first round, the system controller 12 determines that the resonance frequency at which resonance occurs when nothing exists in the power supplying area AR is a frequency lower than the second corrected resonance frequency. In this case, the system controller 12 sets the excitation frequency at which the fourth round of excitation control is performed to a fourth corrected resonance frequency by shifting the second corrected resonance frequency to a low frequency.

When the existence detection voltage Vk in the excitation control of the third round at the second corrected resonance frequency is smaller than the existence detection voltage Vk in the excitation control of the first round, the system controller 12 determines that the resonance frequency at which resonance occurs when nothing exists in the power supplying area AR is a frequency higher than the second corrected resonance frequency. That is, the resonance frequency of the first resonance characteristic AL is between the reference corrected resonance frequency and the second corrected resonance frequency.

In the present embodiment, a predetermined offset amount, which increases the frequency, is added to an intermediate frequency between the reference corrected resonance frequency and the second corrected resonance frequency. The intermediate frequency to which the offset amount is added is set as the first resonance frequency fr1 in the power supplying area AR. The offset amount causes the resonance frequency of the first resonance characteristic AL to be shifted to or coincided with the proximity of the resonance frequency (first resonance frequency fr1) of the second resonance characteristic BL. When the system controller 12 ends the process for adjusting the first resonance frequency fr1 of the power supplying area AR, the system controller 12 starts a process for adjusting the first resonance frequency fr1 of another power supplying area AR.

When the existence detection voltage Vk in the excitation control of the third round at the third corrected resonance frequency is larger than the existence detection voltage Vk in the excitation control of the first round at the first corrected resonance frequency, the system controller 12 determines that the resonance frequency at which resonance occurs when nothing exists in the power supplying area AR is a frequency lower than the third corrected resonance frequency. That is, the resonance frequency of the first resonance characteristic AL is between the reference corrected resonance frequency and the third corrected resonance frequency.

In the present embodiment, a predetermined offset amount, which increases the frequency, is added to an intermediate frequency between the reference corrected resonance frequency and the third corrected resonance frequency. The intermediate frequency to which the offset amount is added is set as the first resonance frequency fr1 in the power supplying area AR. The offset amount causes the resonance frequency of the first resonance characteristic AL to be shifted to or coincided with the proximity of the resonance frequency (first resonance frequency fr1) of the second resonance characteristic BL. When the system controller 12 ends the process for adjusting the first resonance frequency fr1 of the power supplying area AR, the system controller 12 starts a process for adjusting the first resonance frequency fr1 of another power supplying area AR.

Subsequently, the same operation is sequentially repeated. When the first resonance frequency fr1 for each power supplying area AR is set and stored in the nonvolatile memory 13, the system controller 12 ends the process for adjusting the first resonance frequency fr1 of every one of the power supplying areas AR.

When the first resonance frequency fr1 of each power supplying area AR is set and stored in the nonvolatile memory 13, the system controller 12 provides each power supplying area AR with an excitation control signal CT to excite and control the power supplying area AR at the corresponding first resonance frequency fr1.

Supplying Power to Instrument E

A process for supplying power to the instrument E set in each power supplying area AR will now be described.

The system controller 12 accesses the basic power supplying unit circuit 4 of a single power supplying area AR during a fixed period.

In this case, the system controller 12 first provides the drive circuit 22 with an excitation control signal CT to detect the existence of an object. The drive circuit 22 excites the primary coil L1 at the first resonance frequency fr1 in response to the excitation control signal CT.

When excited at the first resonance frequency fr1, the existence detection circuit 24 is supplied with the existence detection voltage Vk from the primary current detection circuit 23. The existence detection circuit 24 determines when the supplied existence detection voltage Vk is in a range from the lower reference value Vk1 to the upper reference value Vk2 (Vk1<Vk<Vk2).

When the existence detection voltage Vk is between the lower reference value Vk1 and the upper reference value Vk2, the existence detection circuit 24 determines that nothing is set in the power supplying area AR and provides the system controller 12 with a detection signal SGx indicating that nothing exists in the power supplying area AR. In response to the detection signal SGx, the system controller 12 shifts to the control of the basic power supplying unit circuit 4 of the next power supplying area AR.

Before shifting to the control of the basic power supplying unit circuit 4 in the next power supplying area AR, the system controller 12 stores information indicating that nothing is set in the power supplying area AR to a storage region assigned to the power supplying area AR in the nonvolatile memory 13.

When the existence detection voltage Vk supplied from the primary current detection circuit 23 is greater than or equal to the upper reference value Vk2 due to the excitation at the first resonance frequency fr1, the existence detection circuit 24 determines that metal M is set in the power supplying area AR. In this case, the existence detection circuit 24 provides the system controller 12 with a detection signal SGx indicating the setting of metal M. In response to the detection signal SGx, the system controller 12 shifts to the control of the basic power supplying unit circuit 4 of the next power supplying area AR.

Before shifting to the control of the basic power supplying unit circuit 4 in the next power supplying area AR, the system controller 12 stores information indicating that metal M is set in the power supplying area AR to a storage region assigned to the power supplying area AR in the nonvolatile memory 13.

When the existence detection voltage Vk supplied from the primary current detection circuit 23 is less than or equal to the lower reference value Vk1 due to the excitation at the first resonance frequency fr1, the existence detection circuit 24 determines that an object other than metal M is set in the power supplying area AR. In this case, the existence detection circuit 24 provides the system controller 12 with a detection signal SGx indicating the setting of an object other than metal M. In response to the detection signal SGx, the system controller 12 provides the drive circuit 22 with an excitation control signal CT for supplying power. In response to the excitation control signal CT for supplying power, the drive circuit 22 excites the primary coil L1 at the second resonance frequency fr2.

The magnetic flux when the primary coil L1 is excited at the second resonance frequency fr2 is transmitted to the object set on the power supplying area AR.

In this case, when the instrument E is set on the power supplying area AR, the secondary coil L2 of the instrument E resonates with the primary coil L1 and power is supplied to the instrument E with high efficiency. Based on the high DC voltage, the communication circuit 8b of the instrument E functions to generate a binary signal (instrument authentication signal ID and excitation request signal RQ). This amplitude-modulates the secondary current of the second resonance frequency fr2 flowing between the two terminals of the secondary coil L2, and the magnetic flux of the secondary current having the amplitude-modulated second resonance frequency fr2 is transmitted as a transmission signal to the primary coil L1.

The signal extraction circuit 25 is provided with the amplitude-modulated transmission signal via the primary current detection circuit 23. The signal extraction circuit 25 determines whether or not the provided transmission signal includes the instrument authentication signal ID and the excitation request signal RQ. When the transmission signal includes the instrument authentication signal ID and the excitation request signal RQ, the signal extraction circuit 25 provides the system controller 12 with a permission signal EN. In response to the permission signal EN, the system controller 12 provides the drive circuit 22 with an excitation control signal CT, which is for supplying power. In response to the excitation control signal CT for supplying power, the drive circuit 22 excites the primary coil L1 at the second resonance frequency fr2. Accordingly, the instrument E is supplied with power over a fixed period.

When the fixed period ends, while continuously exciting the basic power supplying unit circuit 4, the system controller 12 cyclically checks the authentication signal ID or the like (permission signal EN) from the instrument E and shifts to the control of the basic power supplying unit circuit 4 in the next power supplying area AR.

Before shifting to the control of the basic power supplying unit circuit 4 of the next power supplying area AR, the system controller 12 stores information indicating that the instrument E is set and power is being supplied in the storage region assigned to the power supplying area AR in the nonvolatile memory 13.

If the authentication signal ID or the like (permission signal EN) from the instrument E is not generated during the continuous excitation of the basic power supplying unit circuit 4, the system controller 12 stops the excitation that supplies power to the basic power supplying unit circuit 4.

When the transmission signal does not include at least one of the instrument authentication signal ID and the excitation request signal RQ, the signal extraction circuit 25 does not provide the system controller 12 with the permission signal EN. Since there is no permission signal EN, the system controller 12 does not provide the drive circuit 22 with the excitation control signal CT for supplying power. Since the excitation control signal CT for supplying power is not provided, the drive circuit 22 stops the excitation, which is for supplying power, of the primary coil L1 at the second resonance frequency fr2.

The system controller 12 does not generate the excitation control signal CT and shifts to the control of the basic power supplying unit circuit 4 in the next power supplying area AR.

Before shifting to the control of the basic power supplying unit circuit 4 in the next power supplying area AR, the system controller 12 stores, in a storage region assigned to the power supplying area AR in the nonvolatile memory 13, information indicating that the object set in the power supplying area AR is not metal M.

Then, when the first round of control is completed and the control of the basic power supplying unit circuit 4 of the power supplying area AR is executed again, the system controller 12 controls the basic power supplying unit circuit 4 of each power supplying area AR in the order described above. The first round of control executed by the system controller 12 on the basic power supplying unit circuit 4 of each power supplying area AR is based on the information that has been stored in the nonvolatile memory 13 in the storage region corresponding to the power supplying area AR.

In other words, when the first round of control is completed, the storage region for each power supplying area AR in the nonvolatile memory 13 stores one of the four pieces of information listed below.

(1) The power supplying area AR is supplying the instrument E with power.
(2) Nothing is set in the power supplying area AR.
(3) An object that is not metal M is set in the power supplying area AR.
(4) Metal M is set in the power supplying area AR.

When the first round of control is completed, the system controller 12 changes the method for controlling the basic power supplying unit circuit 4 of the basic power supplying area AR based on the information stored in the storage region for the power supplying area AR in the nonvolatile memory 13.

The control when the storage area for a power supplying area AR in the nonvolatile memory 13 stores information indicating that "(1) the power supplying area AR is being supplied with power" will now be described.

When the first round of control is completed and the information of the power supplying area AR stored in the nonvolatile memory 13 indicates that "the power supplying area AR is supplying power," the system controller 12 provides the drive circuit 22 with an excitation control signal CT for supplying power based on the information. In response to the excitation control signal CT for supplying power, the drive circuit 22 excites the primary coil L1 at the second resonance frequency fr2.

The excitation of the primary coil L1 at the second resonance frequency fr2 continues the supply of power to the instrument E. When the fixed period ends, while continuing the excitation for supplying power to the basic power supplying unit circuit 4, the system controller 12 shifts to the control of the basic power supplying unit circuit 4 for the next power supplying area AR.

Before shifting to the control of the basic power supplying unit circuit 4 of the next power supplying area AR, the system controller 12 stores information indicating that "the power supplying area AR is supplying the instrument E with power" in the storage region assigned to the power supplying area AR of the nonvolatile memory 13. Then, the system controller 12 prepares for the next control.

Accordingly, when the instrument E is set in the power supplying area AR and a transmission signal, in which the instrument authentication signal ID and the excitation request signal RQ are amplitude-modulated, is being received, the instrument E set on the power supplying area AR is supplied with power whenever the control of the twenty-four power supplying areas AR is completed.

When power is being supplied, if at least one of the instrument authentication signal ID and the excitation request signal RQ cannot be extracted from the transmission signal, the signal extraction circuit 25 does not provide the system controller 12 with a permission signal EN. In this case, the system controller 12 stops the excitation for supplying power and shifts to the control of the basic power supplying unit circuit 4 of the next power supplying area AR.

Before shifting to the control of the basic power supplying unit circuit 4 for the next power supplying area AR, the system controller 12 rewrites the storage region assigned to the power supplying area AR of the nonvolatile memory 13 and stores information indicating that an object that is not the instrument E is set in the power supplying area AR. Then, the system controller 12 prepares for the next control.

The control when the storage area for a power supplying area AR in the nonvolatile memory 13 stores information indicating that "(2) nothing is set in the power supplying area AR" will now be described.

When the first round of control is completed and the information of the power supplying area AR stored in the nonvolatile memory 13 indicates that "nothing is set in the power supplying area AR," the system controller 12 supplies the drive circuit 22 with an excitation control signal CT for existence detection based on the information in the same manner as the first round of control. In response to the excitation control signal CT for existence detection, the drive circuit 22 excites the primary coil L1 at the first resonance frequency fr1.

(A)

When the excitation results in the existence detection voltage Vk from the primary current detection circuit 23 being between the lower reference value Vk1 and the upper reference value Vk2 (Vk1<Vk<Vk2), in the same manner, the system controller 12 is provided with a detection signal SGx indicating that "nothing exists in the power supplying area AR." In response to the detection signal SGx, the system controller 12 shifts to the control of the basic power supplying unit circuit 4 in the next power supplying area AR.

Before shifting to the control of the basic power supplying unit circuit 4 of the next power supplying area AR, the system controller 12 stores, in the storage region assigned to the power supplying area AR in the nonvolatile memory 13, information indicating that "nothing is set in the power supplying area AR." Then, the system controller 12 prepares for the next control.

(B)

Further, in this case, when the existence detection voltage Vk supplied from the primary current detection circuit 23 is greater than or equal to the upper reference value Vk2, the existence detection circuit 24 provides the system controller 12 with a detection signal SGx indicating that "metal M is set in the power supplying area AR." In response to the detection signal SGx, the system controller 12 shifts to the control of the basic power supplying unit circuit 4 of the next power supplying area AR.

Before shifting to the control of the basic power supplying unit circuit 4 of the next power supplying area AR, the system controller 12 rewrites the information in the storage region assigned to the power supplying area AR of the nonvolatile memory 13 from "nothing exists in the power supplying area AR" to "metal M is set in the power supplying area AR." Then, the system controller 12 prepares for the next control.

(C)

Further, in this case, when the existence detection voltage Vk supplied from the primary current detection circuit 23 is less than or equal to the upper reference value Vk1, the existence detection circuit 24 provides the system controller 12 with a detection signal SGx indicating that "an object other than metal M is set in the power supplying area AR."
In response to the detection signal SGx, the system controller 12 provides the drive circuit 22 with an excitation control signal CT, which is for supplying power.

The system controller 12 provides the drive circuit 2 with the excitation control signal CT, which is for supplying power. In response to the excitation control signal CT for supplying power, the drive circuit 22 excites the primary coil L1 at the second resonance frequency fr2.

(C-1)

The magnetic flux resulting from the excitation is transmitted to the object set on the power supplying area AR. When the instrument E is set on the power supplying area AR, the instrument E is operated by the second resonance frequency fr2, which is determined by the configuration of the instrument E, and is supplied with power with high efficiency. Thus, the communication circuit 8b of the instrument E functions based on high DC voltage and generates an instrument authentication signal ID and an excitation request signal RQ.

As a result, the secondary current of the second resonance frequency fr2 flowing between the two terminals of the secondary coil L2 of the instrument E is amplitude-modulated, and the magnetic flux of the secondary current of the amplitude-modulated second resonance frequency fr2 is transmitted as a transmission signal to the primary coil L1.

The signal extraction circuit 25 of the basic power supplying unit circuit 4 is supplied with the amplitude-modulated transmission signal via the primary current detection circuit 23. The signal extraction circuit 25 determines whether or not the instrument authentication signal ID and the excitation request signal RQ are included in the transmission signal.

The signal extraction circuit 25 provides the system controller 12 with the permission signal EN when the transmission signal includes the instrument authentication signal ID and the excitation request signal RQ. In response to the permission signal EN, the system controller 12 provides the drive circuit 22 with an excitation control signal CT for supplying power. In response to the excitation control signal CT for supplying power, the drive circuit 22 excites the primary coil L1 at the second resonance frequency fr2. Accordingly, the instrument E is supplied with power.

When the fixed period ends, while continuing the excitation for supplying power to the basic power supplying unit circuit 4, the system controller 12 shifts to the control of the basic power supplying unit circuit 4 of the next power supplying area AR.

Before shifting to the control of the basic power supplying unit circuit 4 of the next power supplying area AR, the system controller 12 stores information indicating that "the power supplying area AR is supplying the instrument E with power" in the storage area assigned to the power supplying area AR of the nonvolatile memory 13. Then, the system controller 12 prepares for the next control.

Accordingly, hereafter, during the period in which the instrument E is set in the power supplying area AR and the transmission signal is received in which the instrument authentication signal ID and the excitation request signal RQ are amplitude-modulated, the instrument E set in the power supplying area AR is continuously supplied with power.

(C-2)

When the transmission signal does not include at least one of the instrument authentication signal ID and the excitation request signal RQ, the signal extraction circuit 25 does not provide the system controller 12 with a permission signal EN. Since the system controller 12 is not provided with the permission signal EN, the drive circuit 22 is not provided with the excitation control signal CT, which is used to supply power. Since the excitation control signal CT is not provided, the drive circuit 22 stops the excitation for supplying power to the primary coil L1 at the second resonance frequency fr2. The system controller 12 does not generate the excitation control signal CT and shifts to the control of the basic power supplying unit circuit 4 of the next power supplying area AR.

Before shifting to the control of the basic power supplying unit circuit 4 of the next power supplying area AR, the system controller 12 stores information indicating that "an object that is not metal M is set in the power supplying area AR" in the storage region assigned to the power supplying area AR of the nonvolatile memory 13. Then, the system controller 12 prepares for the next control.

The control when information indicating that an object that is not metal M is set in the power supplying area AR" in the storage region for the power supplying area AR in the nonvolatile memory 13 will now be described.

When the first round of control is completed and the information of the power supplying area AR stored in the nonvolatile memory 13 indicates that "an object that is not metal M is set in the power supplying area," based on the information, the system controller 12 provides the drive circuit 22 with an excitation control signal CT to supply power in the same manner as the first round of control. In response to the excitation control signal CT for supplying power, the drive circuit 22 excites the primary coil L1 at the second resonance frequency fr2.

When provided with a permission signal EN from the signal extraction circuit 25 due to the excitation, the system controller 12 determines that the instrument E is set in the power supplying area AR and that the instrument authentication signal ID and the excitation request signal RQ are provided. Thus, the system controller 12 provides the drive circuit 22 with an excitation control signal CT for supplying power. In response to the excitation control signal CT for supplying power, the drive circuit 22 excites the primary coil L1 at the second resonance frequency fr2. When the fixed period ends, while continuing the excitation for supplying power to the basic power supplying unit circuit 4, the system controller 12 shifts to the control of the basic power supplying unit circuit 4 of the next power supplying area AR.

Before shifting to the control of the basic power supplying unit circuit 4 of the next basic power supplying unit circuit 4, the system controller 12 stores information indicating that "the power supplying area AR is supplying the instrument E with power" in the storage region assigned to the power supplying area AR of the nonvolatile memory 13. Then, the system controller 12 prepares for the next control.

When a permission signal EN is not provided from the signal extraction circuit 25 regardless of the excitation, the system controller 12 reads the information of the adjacent power supplying area AR from the nonvolatile memory 13. When information indicating that "an object that is not metal M exists in the power supplying area AR" is stored in the nonvolatile memory 13 for at least one power supplying area AR and the adjacent power supplying area AR, the system controller 12 assumes that the instrument E exists extending over the power supplying area AR that is subject to control and the adjacent power supplying area AR.

The system controller 12 provides the excitation control signal CT for supplying power to drive circuits 22 of the power supplying area AR that is subject to the control and the adjacent power supplying area AR. In response to the excitation control signal CT for supplying power, the drive circuits 22 excite the primary coils L1 at the second resonance frequency fr2 in the power supplying area AR that is subject to the control and the adjacent power supplying area AR.

Consequently, the primary power of the second resonance frequency fr2 is transmitted from the primary coils L1 of the power supplying areas AR to the object extending over the power supplying area AR that is subject to control and the adjacent power supplying area AR. In this case, when the object is the instrument E, the rectification circuit 8a can acquire DC voltage that allows the communication circuit 8b to be driven. As a result, the communication circuit 8b generates the instrument authentication signal ID and the excitation request signal RQ. This amplitude-modulates the secondary current of the second resonance frequency fr2 flowing between the two terminals of the secondary coil L2 of the instrument E. The magnetic flux of the secondary current having the amplitude-modulated second resonance frequency fr2 is transmitted as a transmission signal to the primary coil L1 of each power supplying area AR.

When the excitation provides the system controller 12 with a permission signal EN from the signal extraction circuit 25 of each power supplying area AR, the system controller 12 determines that the instrument E is set over a plurality of power supplying areas AR and that the instrument authentication signal ID and the excitation request signal RQ are being provided. Then, the system controller 12 provides the drive circuit 22 of each power supplying area AR with an excitation control signal CT for supplying power. In response to the excitation control signal CT for supplying power, each drive circuit 22 excites the corresponding primary coil L1 with the second resonance frequency fr2.

More specifically, the secondary coil L2 of the instrument E that is set over a plurality of power supplying areas AR resonates with the primary coils L1 of the corresponding power supplying areas AR that are simultaneously driven. Thus, the instrument E receives power with high efficiency. When the fixed period ends, while continuing the excitation for supplying power to the basic power supplying unit circuits 4, the system controller 12 shifts to the control of the basic power supplying unit circuit 4 of the next power supplying area AR.

Before shifting to the control of the basic power supplying unit circuit 4 of the next basic power supplying unit circuit 4, the system controller 12 stores information indicating that "the power supplying area AR and the adjacent power supplying area AR is supplying the instrument E with power" in the storage region assigned to the power supplying area AR of the nonvolatile memory 13. Then, the system controller 12 prepares for the next control.

When exciting the power supplying area AR in the next round, information indicating that "the instrument E is arranged over adjacent power supplying areas AR" is stored in the storage region assigned to the power supplying area AR of the nonvolatile memory 13. Thus, the primary coils L1 of the adjacent power supplying areas AR are simultaneously excited at the second resonance frequency fr2, and the instrument E arranged over the adjacent power supplying areas AR are continuously supplied with power.

When information indicating that "the instrument E is arranged over adjacent power supplying areas AR" is not stored in the storage region for the power supplying area AR of the nonvolatile memory 13, the system controller 12 does not provide the drive circuit 22 with the excitation control signal CT for supplying power. Since the excitation control signal CT for supplying power is not provided, the drive circuit 22 stops exciting the primary coil L1 that supplies power at the second resonance frequency fr2. The system controller 12 stops generating the excitation control signal CT and shifts to the control of the basic power supplying unit circuit 4 in the next power supplying area AR.

Before shifting to the control of the basic power supplying unit circuit 4 of the next power supplying area AR, the system controller 12 stores information indicating that "an object that is not metal M is set in the power supplying area AR" in a storage region assigned to the power supplying area AR in the nonvolatile memory 13. Then, the system controller 12 prepares for the next control.

The control when information indicating that "metal is set in the power supplying area AR" is stored in the storage region of the power supplying area AR in the nonvolatile memory 13 will now be described.

When the first round of control is completed, and the information of the power supplying area AR stored in the nonvolatile memory 13 indicates that "metal is set in the power supplying area AR," based on the information, the system controller 12 does not provide the drive circuit 22 with an excitation control signal CT for existence detection. Then, the system controller 12 shifts to the control of the basic power supplying unit circuit 4 of the next power supplying area AR.

Before shifting to the control of the basic power supplying unit circuit 4 of the next power supplying area AR, the system controller 12 stores information indicating that "metal is set in the power supplying area AR" in a storage region assigned to the power supplying area AR in the nonvolatile memory 13. Then, the system controller 12 prepares for the next control.

Based on the information indicating that "metal is set in the power supplying area AR," the system controller 12 is configured to shift to the control of the basic power supplying unit circuit 4 in the next power supplying area AR. The system controller 12 executes control for performing existence detection after a predetermined time (predetermined number of rounds) from when metal M or the instrument E is first detected. This is to reduce the load on the system controller 12 when metal M exists in a power supplying area AR and the set metal M is not removed for a certain time.

The advantages of the present embodiment will now be described.

(1) The resonance frequency is selected from the first resonance frequency fr1 and the second resonance frequency fr2, and the primary coil L1 arranged in the power supplying area AR may be excited at the selected resonance frequency. The first resonance frequency fr1 is set based on the resonance frequency determined by the primary side circuit formed by the primary coil L1 and the resonance capacitor C. Further, the second resonance frequency fr2 is set based on the inductance component of the secondary coil L2 and the capacitance component of the resonance capacitor Cx of the power receiving circuit 8 arranged in the instrument E.

Accordingly, the existence of an object in the power supplying area AR and the supply of power to the instrument E may be detected with a single primary coil L1. This simplifies the structure and allows for the device to be reduced in size. In addition, the primary coil L1 is excited at the first resonance frequency fr1. Thus, by designing a fixed number of the primary coils L1 and the resonance capacitor C, a Q value having high resonance may be designed, and the existence of an object may be detected with high accuracy. Further, by exciting the primary coil L1 at the second resonance frequency fr2, the coupling degree of the primary coil L1 and the secondary coil L2 may be reduced when operating at the second resonance frequency fr2. Moreover, power supplying may be performed with high efficiency.

(2) When the primary coil L1 is excited at the first resonance frequency fr1 and it is determined that metal M is arranged in the power supplying area AR, the excitation of the primary coil L1 at the first resonance frequency fr1 and the second resonance frequency fr2 is stopped. Accordingly, the metal M arranged in the power supplying area AR is not induction-heated.

(3) When the primary coil L1 is excited at the first resonance frequency fr1 and it is determined that an object other than metal M is arranged in the power supplying area AR, the primary coil L1 is excited at the second resonance frequency to detect the instrument E. When the instrument E is arranged in the power supplying area AR, the primary coil L1 is excited at the second resonance frequency fr2 to supply power.

Accordingly, it can be immediately detected whether or not the object arranged in the power supplying area AR is the instrument E. Further, power supplying may be immediately performed.

(4) When the primary coil L1 is driven at the second resonance frequency fr2 and it is determined that the object arranged in the power supplying area AR is not the instrument E, the excitation of the primary coil L1 at the second resonance frequency fr2 is stopped.

This allows for immediate shifting to the control of the basic power supplying unit circuit 4 of the next power supplying area AR.

(5) The determining of whether or not the object arranged in the power supplying area AR is the instrument E includes receiving secondary power based on excitation of the primary coil at the second resonance frequency, transmitting information to the power supplying device 1 with the secondary power, and determining whether or not the power supplying device 1 received the information from the instrument E. Accordingly, the instrument E may be accurately determined without erroneous detections.

(6) The power supplying device 1 includes a plurality of power supplying areas AR defined in the setting surface 3, and the primary coil L1 is arranged in each power supplying area AR. The primary coil L1 of each power supplying area AR is excited at either one of the first resonance frequency fr1 and the second resonance frequency fr2.

Accordingly, the instrument E may be supplied with power regardless of where the instrument E is set on the setting surface 3. Further, the power supplying device 1 can detect metal M wherever the metal M is set on the setting surface 3.

Moreover, in the present embodiment, the existence detection of an object is performed by sequentially exciting the primary coils L1 of the power supplying areas AR in rounds. This allows the power supplying device 1 to detect which one of the power supplying areas AR the metal M or the instrument E is presently set in.

(7) When sequentially exciting the primary coils L1 of the power supplying areas AR in rounds, if the previous excitation of the primary coil L1 of a power supplying area AR was for supplying power, the primary coil L1 of the power supplying area AR is excited at the second resonance frequency fr2 and not the first resonance frequency fr1. In other words, the power supplying device 1 is configured to supply power to the instrument E without performing existence detection. Accordingly, power supplying may be performed with high efficiency on the instrument E over a long period.

(8) When determined in the previous excitation of the primary coil of a power supplying area AR that metal M exists in the power supplying area AR, the primary coil L1 is not excited at the first and second resonance frequencies fr1 and fr2. The power supplying device 1 immediately shifts to the excitation control of the primary coil L1 of the next power supplying area AR.

Accordingly, the power supplying device 1 is capable of supplying power with high efficiency and capable of detecting metal M.

(9) When determining in the previous excitation of the primary coil of a power supplying area AR that an object does not exist in the power supplying area AR, the power supplying device 1 excites the primary coil L1 at the first resonance frequency fr1 for object existence detection. Based on a primary current newly flowing to the primary coil L1, the power supplying device 1 determines whether or not an object exists in the power supplying area AR. Accordingly, information related to each power supplying area AR indicating the detection of metal M and the existence detection of the instrument E is constantly stored, and control based on the detection is readily performed.

(10) In the previous excitation of the primary coil of a power supplying area AR, when determining that the object existing in the power supplying area AR is not the instrument E, the power supplying device 1 reads from the nonvolatile memory 13 information acquired from the previous excitation of the adjacent power supplying area AR that is controlled next. When the information of the adjacent power supplying area AR indicates that an object exists in the power supplying area AR, the two primary coils L1 of both power supplying areas AR are simultaneously excited at the second resonance frequency fr2.

Accordingly, when the secondary coil L2 of the instrument E is set over two or a plurality of power supplying areas AR, the power supplied from a single primary coil L1 would be insufficient for allowing operation of the instrument E. However, the lacking power of the instrument E would be supplemented with the supply of power from the adjacent primary coil L1. As a result, the instrument E set over two or a plurality of power supplying areas AR can transmit the instrument authentication signal ID and the excitation request signal RQ to the power supplying device 1 and be sufficiently supplied with power.

(11) The frequency fr1 for detecting metal M or the instrument E in each power supplying area AR is adjustable.

Accordingly, the first resonance frequency fr1 that is presently optimal for the primary coil L1 of each power supplying area AR is set, and the primary coil L1 is excited at the set first resonance frequency fr1. Thus, metal detection may be performed with high accuracy.

The above embodiment may be modified as described below.

In the above embodiment, twenty-four power supplying areas AR are formed in the setting surface 3. However, there is no limitation to such a structure and the number of the power supplying areas AR formed in the setting surface 3 may be changed.

Figure 8:
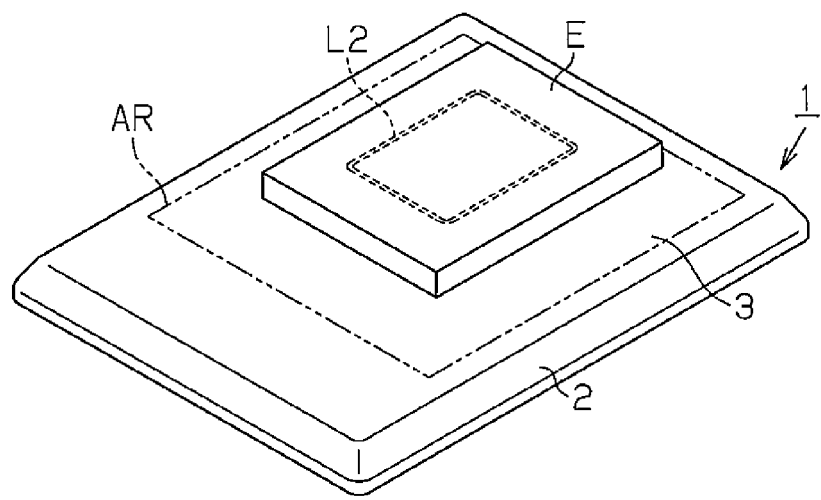
FIG. 8 is a perspective view entirely showing a contactless power transmission device of a further example.
Figure 9:
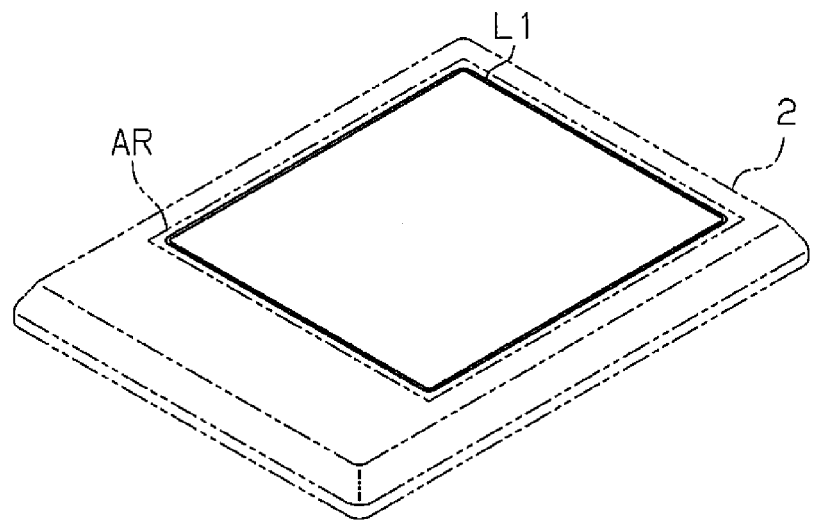
FIG. 9 is a schematic diagram of the contactless power transmission device of the further example showing power supplying areas and the layout of primary coils in the power supplying areas.

Further, as shown in FIGS. 8 and 9, a single power supplying area AR may be formed in the setting surface 3, and a single primary coil L1 may be arranged in the power supplying area AR.

In the above embodiment, an indicator lamp such as a light emitting diode is not particularly arranged on the setting surface. However, a number of indicator lamps, each corresponding to a power supplying area AR, may be arranged on the setting surface 3.

When adjusting the first resonance frequency of the primary coil L1 of each power supplying area AR, the system controller 12 may change the color of the light emitted from an indicator lamp in accordance with whether or not the adjustment of the first resonance frequency fr1 has been completed. For example, when the adjustment of the first resonance frequency fr1 is completed, the system controller 12 may emit blue light from the indicator lamp of the power supplying area AR. When the adjustment of the first resonance frequency fr1 is not completed, the system controller 12 may emit red light from the indicator lamp of the power supplying area AR.

Further, when detecting the instrument E and supplying power, the system controller 12 may change the color of the light emitted from the indication lamp in accordance with whether metal M and an object is existing or in accordance with whether the instrument E is being supplied with power. For example, when the instrument E is set in a power supplying area, the indication lamp of the power supplying area that is being supplied with power may be intermittently illuminated in blue. When an object that is not metal M is set in the power supplying area, the system controller 12 may intermittently illuminate the indication lamp of the power supplying area in red. Further, when metal M is set in the power supplying area, the system controller 12 may intermittently illuminate the indication lamp of the power supplying area in red. When nothing exists in the power supply area, the system controller 12 may deactivate the indication lamp.

In the above embodiment, when a full bridge operation is performed during existence detection, the full bridge circuit 21 is switched ON and OFF at a low duty ratio to excite the primary coil L1 at the first resonance frequency fr1. The DC voltage Vdd applied to the full bridge circuit 21 may be decreased during existence detection without lowering the duty ratio. This obtains the same effect.

In the above embodiment, the process for setting the first resonance frequency fr1 for detecting metal M or the instrument E is performed on the primary coil L1 of every one of the power supplying areas AR. Instead, the process for setting the first resonance frequency fr1 may be performed on the primary coil L1 of a specific one or specific ones of the power supplying areas AR, and the primary coil L1 of every one of the power supplying areas AR may be excited at the first resonance frequency fr1 obtained in the setting process.

Further, in the above embodiment, the process for setting the first resonance frequency fr1 is performed based on the operation of the adjustment switch. Instead, the process for setting the first resonance frequency fr1 may be performed whenever a predetermined time elapses by using a timer or the like incorporated in the system controller 12.

In the above embodiment, for each power supplying area AR, the process for setting the first resonance frequency fr1 obtains an intermediate frequency where the output is maximal when nothing is set, and an offset amount is added to the obtained intermediate frequency to set the first resonance frequency fr1.

Instead, the frequency may be changed for the primary coil L1 of each power supplying area AR when exciting the primary coil L1. In each primary coil L1, the frequency when the output reaches a predetermined output (e.g., the middle value Vmid shown in FIG. 7) may be set as the first resonance frequency fr1 of the primary coil L1.

In the above embodiment, the process for setting the first resonance frequency fr1 is performed when nothing is set in the power supplying area AR. However, the process for setting the first resonance frequency fr1 may be performed when metal is set in the power supplying area AR.

In the above embodiment, although not particularly described, the second resonance frequency fr2 is set by placing the instrument E in each power supplying area AR. In this condition, the second resonance frequency fr2 may be set as the resonance frequency that excites the primary coil L1 and resonates the secondary circuit formed by the secondary coil L2 and the resonance capacitor Cx.

In the above embodiment, the primary coils L1 and the secondary coils L2 are shaped to be tetragonal but are not limited to the tetragonal shape. For example, the primary coils L1 and the secondary coils L2 may have other shapes and be shaped as a polygon other than a tetragon or be shaped as a circle. Further, the primary coils L1 and the secondary coils L2 are not particularly limited in size. For example, the primary coils L1 may relatively differ in size from the secondary coil L2.

In the above embodiment, the existence detection circuit 24 detects whether metal M or the instrument E exists. However, the existence detection circuit 24 may be omitted, and the system controller 12 may determine whether or not metal M exists.

In the above embodiment, the signal extraction circuit 25 detects whether or not the instrument E exists. However, the signal extraction circuit 25 may be omitted, and the system controller 12 may determine whether or not the instrument E exists.

In the above embodiment, the primary coils L1 is shaped to be tetragonal in conformance with the power supplying area AR, and the primary coils L1 are arranged in a grid. However, there is no limit to such a structure. For example, when the primary coil L1 is shaped to be hexagonal, the primary coils L1 may be arranged in a honeycomb form.

In the above embodiment, the primary coil L1 is excited by a full bridge operation of the full bridge circuit. Instead, the primary coil L1 may be excited by a half bridge operation.

The invention claimed is:
1. A method for driving a contactless power transmission device including a setting surface, which includes a power supplying area, and a primary side circuit, which is located in the power supplying area and formed by a primary coil and a capacitor, wherein when an electric instrument is set in the power supplying area, the contactless power transmission device excites the primary coil located in the power supplying area and produces electromagnetic induction at a secondary coil of a power receiving device arranged in the electric instrument to supply power to the electric instrument, the method comprising:
  exciting the primary coil selectively using a first resonance frequency, which is in the proximity of a frequency determined by the primary coil and the capacitor located in the primary side circuit, and a second resonance frequency, which is in the proximity of a frequency determined by an inductance component and a capacitance component of the electric instrument when the primary coil is opposed to the secondary coil,
  wherein the exciting the primary coil includes:
    exciting the primary coil at the first resonance frequency to detect metal or the electric device and determine whether or not metal exists in the power supplying area based on a primary coil that flows to the primary coil,
    suspending excitation of the primary coil at the first resonance frequency and the second resonance fre- quency when determined that the metal exists in the power supplying area or that nothing exists in the power supplying area, exciting the primary coil at the second resonance frequency to detect the electric instrument when determined that an object other than the metal exists in the power supplying area and determine whether or not the object existing in the power supplying area is the electric instrument based on the primary current, and exciting the primary coil at the second resonance frequency and supplying power to the electric instrument when determined that the object is the electric instrument.

2. The method for driving a contactless power transmission device according to claim 1, wherein the determining whether or not the object existing in the power supplying area includes performing a determination based on information from the electric instrument based on secondary power received by the electric instrument.

3. The method for driving a contactless power transmission device according to claim 1, wherein the exciting the primary coil includes suspending excitation of the primary coil at the second resonance frequency when determined that the object existing in the power supplying area is not the electric instrument.

4. The method for driving a contactless power transmission device according to claim 1, wherein
the power supplying area is one of a plurality of power supplying areas defined in the setting surface,
the primary coil is one of a plurality of primary coils respectively located in the plurality of power supplying areas, and
the exciting the primary coil includes exciting each of the plurality of primary coils selectively using the first resonance frequency and the second resonance frequency.

5. The method for driving a contactless power transmission device according to claim 4, wherein the exciting the primary coil includes
exciting the plurality of primary coils in rounds, and
when a primary coil is excited at the second resonance frequency in a previous round, exciting the primary coil at the second resonance frequency and not at the first resonance frequency and shifting to the next primary coil.

6. The method for driving a contactless power transmission device according to claim 5, wherein the exciting the primary coil includes
when determined in the previous round that an object that is metal exists in a power supplying area of a primary coil, shifting, without exciting the primary coil at the first resonance frequency and the second resonance frequency, to the next primary coil.

7. The method for driving a contactless power transmission device according to claim 5, wherein the exciting the primary coil includes
when determined in the previous round that nothing exists in a power supplying area of a primary coil, exciting the primary coil at the first resonance frequency to detect metal or the electric instrument and determining whether metal or an object other than metal exists in the power supplying area based on a primary current flowing to the primary coil.

8. The method for driving a contactless power transmission device according to claim 7, wherein the exciting the primary coil includes:

when determined that an object existing in a power supplying area of a primary coil is not the electric device, suspending excitation of the primary coil at the second resonance frequency and shifting to the next primary coil; and when exciting a primary coil of a power supplying area where an existing object is determined to be the electric instrument, exciting the primary coil at the second resonance frequency and shifting to the next primary coil.

9. The method for driving a contactless power transmission device according to claim 7, wherein the exciting the primary coil includes
when determined that an object, which exists in a power supplying area corresponding to a primary coil adjacent to a primary coil of a power supplying area where an existing object is determined as not being the electric instrument in the previous round, is not the electric instrument, simultaneously exciting the two primary coils of both power supplying areas at the second resonance frequency and determining whether or not the object existing in both power supplying areas is the electric instrument.

10. A contactless power transmission device including a setting surface, which includes a power supplying area, and a primary side circuit, which is located in the power supplying area and formed by a primary coil and a capacitor, wherein when an electric instrument is set in the power supplying area, the primary coil located in the power supplying area is excited to produce electromagnetic induction at a secondary coil of a power receiving device arranged in the electric instrument to supply power to the electric instrument, the contactless power transmission device comprising:

a signal generation circuit that selectively generates a first drive signal and a second drive signal, wherein the first drive signal excites the primary coil at a first resonance frequency, which is in the proximity of a frequency determined by the primary coil and the capacitor located in the primary side circuit, and the second drive signal excites the primary coil at a second resonance frequency, which is in the proximity of a frequency determined by an inductance component and a capacitance component of the electric instrument when the primary coil is opposed to the secondary coil;

an excitation circuit that excites the primary coil in accordance with one of the first drive signal and the second drive signal provided from the signal generation circuit; and a control circuit that generates an excitation control signal for switching the first drive signal and the second drive signal generated by the signal generation circuit, the contactless power transmission device further comprising:

an existence detection circuit that determines, when exciting the primary coil as the first resonance frequency, whether or not metal or an object other than metal exists in the power supplying area based on a primary current that flows to the primary coil; and an electric instrument determination circuit that determines, when exciting the primary coil at the second resonance frequency, whether or not the electric instrument is set in the power supplying area based on the primary current that flows to the primary coil.

11. The contactless power transmission device according to claim 10, wherein the control circuit provides the signal generation circuit with the first drive signal, excites the primary coil at the first resonance frequency with the excitation circuit, and acquires information from the existence detection circuit indicating whether or not the metal or the object other than metal exists in the power supplying area; and the control circuit provides the second drive signal from the signal generation circuit, excites the primary coil at the second resonance frequency with the excitation circuit, and acquires information from the electric instrument determination circuit indicating whether or not the object other than metal set in the power supplying area is the electric instrument that can be supplied with power.

12. The contactless power transmission device according to claim 11, wherein the information indicating whether the metal or the object other than metal exists in the power supplying area includes information indicating that nothing exists in the power supplying area.

13. The contactless power transmission device according to claim 10, wherein the power supplying area is one of a plurality of power supplying areas defined in the setting surface;

the primary coil is one of a plurality of primary coils respectively located in the plurality of power supplying areas;

the signal generation circuit is one of a plurality of signal generation circuits respectively located in the plurality of power supplying areas;

the excitation circuit is one of a plurality of excitation circuits respectively located in the plurality of power supplying areas;

the electric instrument determination circuit is one of a plurality of electric instrument determination circuits respectively located in the plurality of power supplying areas;

the existence detection circuit is one of a plurality of existence detection circuits respectively located in the plurality of power supplying areas;

the contactless power transmission device comprises a plurality of basic power supplying unit circuits respectively located in the plurality of power supplying areas;

each of the plurality of basic power supplying unit circuits is formed by the signal generation circuit, the excitation circuit, the electric instrument determination circuit, and the existence detection circuit; and the plurality of basic power supplying unit circuits are all controlled by the control circuit.

14. The contactless power transmission device according to claim 13, wherein the control circuit excites the plurality of primary coils in rounds, and when a primary coil is excited at the second resonance frequency in a previous round, the control circuit excites the primary coil at the second resonance and not at the first resonance frequency and shifts to the next primary coil.

15. The contactless power transmission device according to claim 14, when determining in the previous round that an object that is metal exists in a power supplying area of a primary coil, the control circuit shifts, without exciting the primary coil at the first resonance frequency and the second resonance frequency, to the primary coil of the next power supplying area.

16. The contactless power transmission device according to claim 14, when determining in the previous round that an object does not exist in a power supplying area of a primary coil, the control circuit excites the primary coil at the first resonance frequency to detect metal or the electric instrument and determine whether metal or an object other than metal exists in the power supplying area based on a primary current flowing to the primary coil.

17. The contactless power transmission device according to claim 16, wherein when determining that an object existing in a power supplying area of a primary coil is not the electric device, the control circuit suspends excitation of the primary coil at the second resonance frequency and shifts to the next primary coil; and when determining that an object existing in the power supplying area is the electric instrument, the control circuit excites the primary coil at the second resonance frequency and shifts to the next primary coil.

18. The contactless power transmission device according to claim 16, wherein when determining that an object, which exists in a power supplying area corresponding to a primary coil adjacent to a primary coil of a power supplying area where an existing object is determined as not being the electric instrument in the previous round, is not the electric instrument, the control circuit simultaneously excites the two primary coils of both power supplying areas at the second resonance frequency and determines whether or not the object existing in both power supplying areas is the electric instrument.

19. The contactless power transmission device according to claim 10, wherein the control circuit provides the signal generation circuit with an excitation control signal through the excitation circuit to excite the primary coil at a plurality of corrected resonance frequencies, and the control circuit acquires the first resonance frequency from information from the existence detection circuit based on excitation of the primary coil at the plurality of corrected resonance frequencies and provides the signal generation circuit with the excitation control signal to excite the primary coil at the acquired first resonance frequency with the excitation circuit.

* * * * *